US010667126B2

(12) United States Patent
Wifvesson et al.

(10) Patent No.: US 10,667,126 B2
(45) Date of Patent: May 26, 2020

(54) ACCESS STRATUM SECURITY IN A WIRELESS COMMUNICATION SYSTEM

(71) Applicant: Telefonaktiebolaget LM Ericsson (publ), Stockholm (SE)

(72) Inventors: Monica Wifvesson, Lund (SE); Prajwol Kumar Nakarmi, Sollentuna (SE); Pasi Saarinen, Bromma (SE); Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/338,613

(22) PCT Filed: Oct. 1, 2018

(86) PCT No.: PCT/EP2018/076650
§ 371 (c)(1),
(2) Date: Apr. 1, 2019

(87) PCT Pub. No.: WO2019/068644
PCT Pub. Date: Apr. 11, 2019

(65) Prior Publication Data
US 2020/0128398 A1    Apr. 23, 2020

Related U.S. Application Data

(60) Provisional application No. 62/566,840, filed on Oct. 2, 2017.

(51) Int. Cl.
*H04W 12/00* (2009.01)
*H04W 12/08* (2009.01)
(Continued)

(52) U.S. Cl.
CPC ....... *H04W 12/0013* (2019.01); *H04L 63/205* (2013.01); *H04W 12/08* (2013.01); *H04W 12/10* (2013.01); *H04W 80/10* (2013.01)

(58) Field of Classification Search
None
See application file for complete search history.

(56) References Cited

U.S. PATENT DOCUMENTS

| 2010/0115275 A1* | 5/2010 | Suh | H04W 12/08 713/168 |
| 2011/0136473 A1* | 6/2011 | Gupta | H04W 12/08 455/411 |

(Continued)

OTHER PUBLICATIONS

3GPP, "3rd Generation Partnership Project; Technical Specification Group Services and System Aspects; 3GPP System Architecture Evolution (SAE); Security architecture (Release 15)", 3GPP TS 33.401 V15.0.0, Jun. 2017, 1-153.

(Continued)

*Primary Examiner* — Rebecca E Song
(74) *Attorney, Agent, or Firm* — Murphy, Nilak & Homiller, PLLC

(57) ABSTRACT

A radio access network, RAN, node configures user plane access stratum, AS, security in a wireless communication system that includes a radio access network, RAN, and a core network, CN. The RAN node is configured to receive, from the CN, signaling that indicates a decision by the CN of whether or not the RAN node is to activate user plane AS security and that indicates whether or not the RAN node is allowed to overrule the decision by the CN. For example, the signaling may indicate whether the decision by the CN is a command that the RAN node must comply with or a preference that the RAN node is permitted to overrule. Regardless, the RAN node may also be configured to activate or not activate user plane AS security, depending on the signaling.

28 Claims, 18 Drawing Sheets

(51) Int. Cl.
*H04L 29/06* (2006.01)
*H04W 80/10* (2009.01)
*H04W 12/10* (2009.01)

(56) References Cited

U.S. PATENT DOCUMENTS

2016/0105800 A1 4/2016 Patil et al.
2018/0343566 A1* 11/2018 Yu .................... H04W 12/1006

OTHER PUBLICATIONS

3GPP, "3rd Generation Partnership Project; Technical Specification Group Services and System Aspects; Procedures for the 5G System; Stage 2 (Release 15)", 3GPP TS 23.502 V1.0.0, Sep. 2017, 1-166.
3GPP, "3rd Generation Partnership Project; Technical Specification Group Services and System Aspects; System Architecture for the 5G System; Stage 2 (Release 15)", 3GPP TS 23.501 V1.3.0, Sep. 2017, 1-174.
3GPP, "3rd Generation Partnership Project; Technical Specification Group Services and System Aspects; Security architecture and procedures for 5G system (Release 15)", 3GPP TS 33.501 V1.0.0, Mar. 2018.
3GPP, "3rd Generation Partnership Project; Technical Specification Group Services and System Aspects; Study on the security aspects of the next generation system (Release 14)", 3GPP TR 33.899 V1.2.0, Jun. 2017.
Ericsson, "Clause 6 (user plane security—conflict between RAN and CN)", 3GPP TSG WG3 (Security) Meeting #90, S3-180424, Jan. 22-26, 2018, Sweden.

* cited by examiner

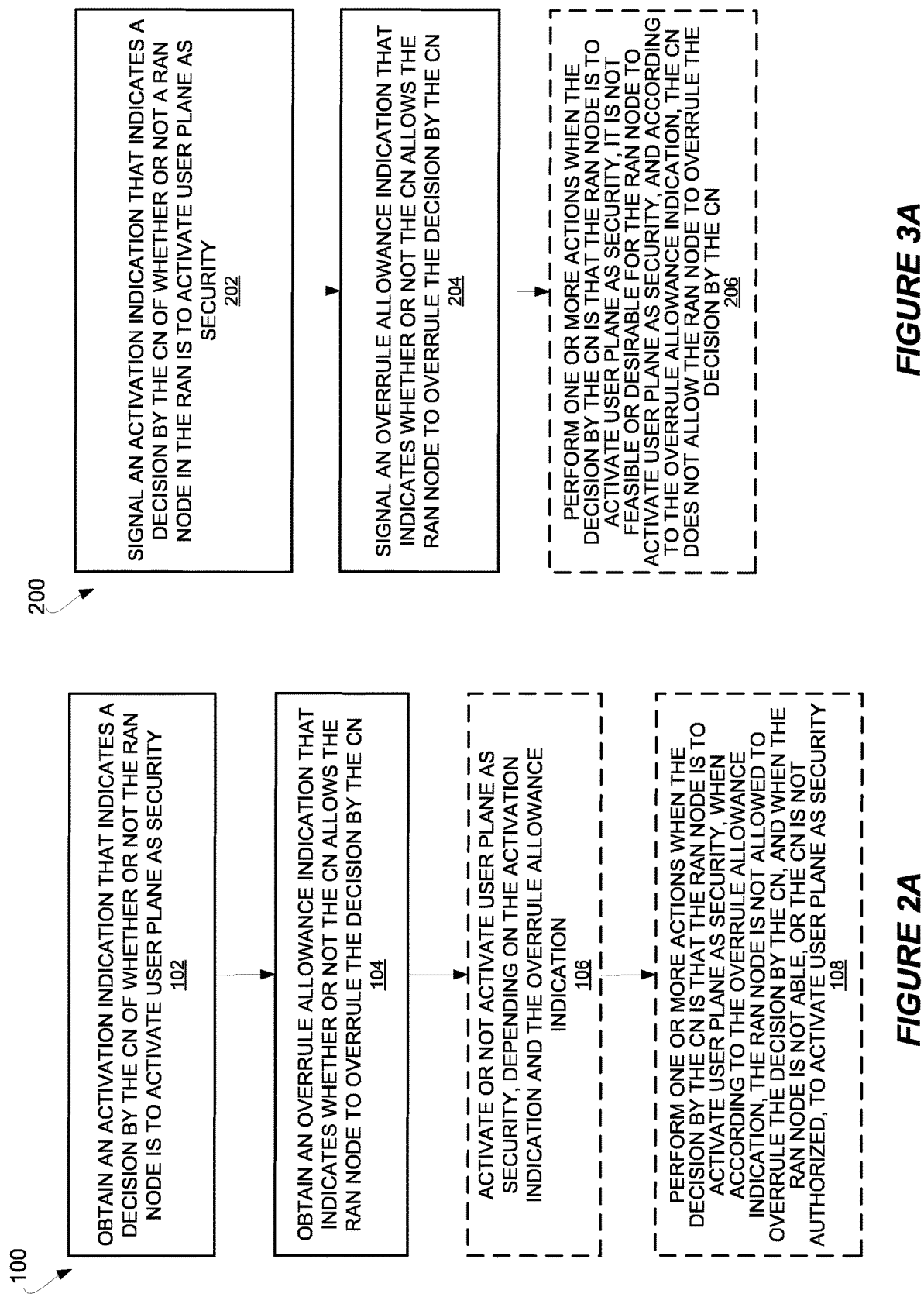

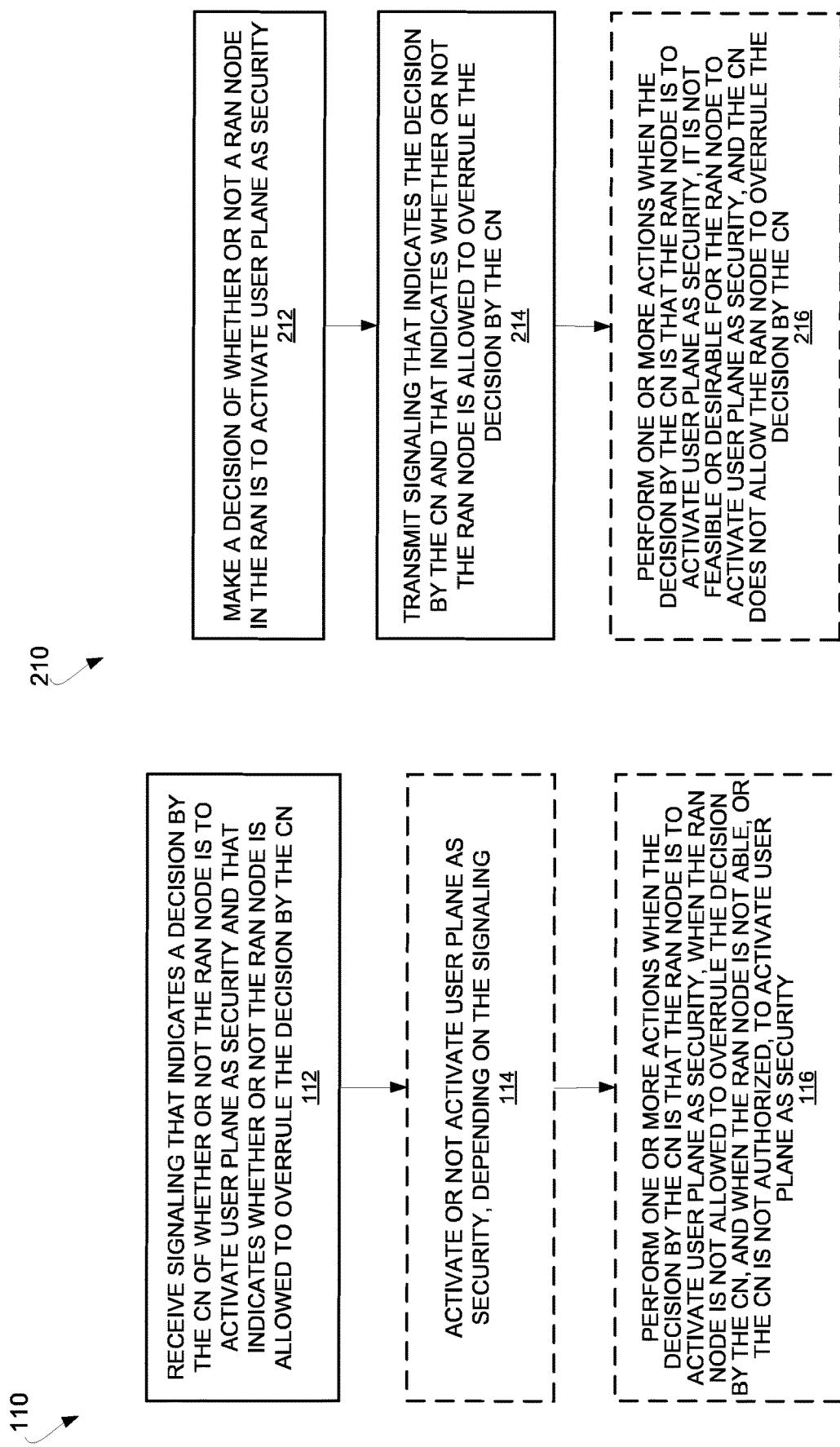

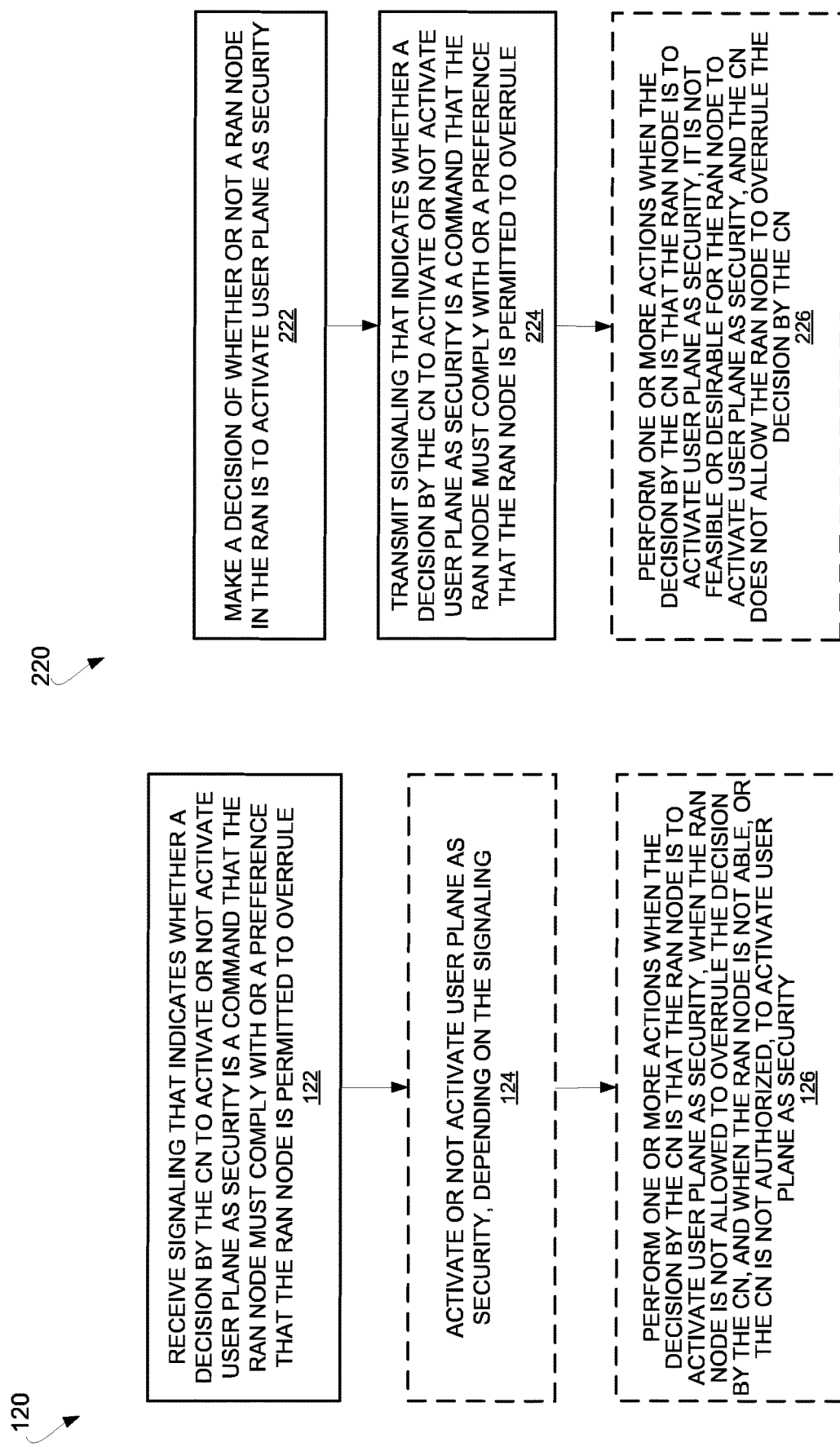

ACCESS STRATUM SECURITY IN A WIRELESS COMMUNICATION SYSTEM

BACKGROUND

Securing a wireless communication system involves protecting the integrity and/or confidentiality of exchanged communication. A Long Term Evolution (LTE) system for instance mandates that user plane communications on the access stratum (AS) between the user equipment (UE) and the radio access network (RAN) be protected in terms of confidentiality, and that control plane communications on the AS be protected in terms of both integrity and confidentiality. Inflexibly requiring this sort of security without exception may not be desirable in all circumstances, though, as it may prove unnecessarily taxing on network resources, power, system throughput, etc. Allowing user plane AS security to be optional nonetheless introduces challenges in ensuring that the security is selectively activated when desired and left deactivated when undesired.

SUMMARY

According to some embodiments herein, a core network (CN) makes a decision of whether or not a radio access network (RAN) node is to activate user plane access stratum (AS) security, e.g., in the form of user plane integrity protection and/or confidentiality protection. Notably, though, the CN indicates to the RAN node whether or not the CN allows the RAN node to overrule that decision by the CN. In some embodiments, this effectively enables the CN to choose between (i) absolutely enforcing the CN's decision as a command that the RAN node must comply with, e.g., as a condition for the RAN node to serve a user plane session; and (ii) flexibly offering the CN's decision as a request or preference that the RAN node may simply take into account, e.g., along with other information available locally at the RAN node. That is, the CN may centrally maintain absolute control over user plane AS security activation or defer/distribute at least some of that control to the RAN node. The CN may for example not allow the RAN node to overrule its security activation decision if information in the CN (e.g., concerning the sensitivity, type, or priority of user plane traffic) suggests that the CN's decision should trump or outweigh any input the RAN node might have on the desirability or feasibility of security activation (e.g., the impact of security activation on the loading or power efficiency of the RAN node).

In these and other contexts, therefore, some embodiments herein advantageously configure user plane AS security in a robust way that flexibly distributes security activation decision-making amongst the CN and RAN as needed to account for information available locally in the CN and RAN, while strictly centralizing security activation decision-making to the CN when needed to absolutely prioritize information available in the CN. This may in turn bolster user plane security in terms of confidentiality and/or integrity protection, as well as facilitate load balancing, radio resource efficiency, and power efficiency in the network.

More particularly, embodiments herein include a method for configuring user plane access stratum (AS) security in a wireless communication system that includes a radio access network (RAN) and a core network (CN). The method is performed by a RAN node in the RAN. The method comprises receiving, from the CN, signaling that indicates a decision by the CN of whether or not the RAN node is to activate user plane AS security and that indicates whether or not the RAN node is allowed to overrule the decision by the CN. The method in some embodiments also includes activating or not activating user plane AS security, depending on the signaling.

In some embodiments, the method comprises activating or not activating user plane AS security, further depending on information indicating an ability or desirability of the RAN node to activate user plane AS security.

In some embodiments, the method further comprises determining whether or not activate user plane AS security, based on one or more of: a loading level of the RAN node; power efficiency or availability at the RAN node; and authorization of the CN to activate user plane AS security; and a mode of the RAN node.

In some embodiments, the signaling applies specifically for a particular user plane session and is received during a procedure for establishing the user plane session for a particular wireless communication device.

In some embodiments, the method further comprises performing one or more actions when the decision by the CN is that the RAN node is to activate user plane AS security, the RAN node is not allowed to overrule the decision by the CN, and the RAN node is not able, or the CN is not authorized, to activate user plane AS security. The one or more actions include canceling, rejecting, or dropping a user plane session or user plane session establishment.

In some embodiments, the decision by the CN is a decision of whether or not the RAN node is to activate user plane AS security in the form of user plane integrity protection or is a decision of whether or not the RAN node is to activate user plane AS security in the form of user plane confidentiality protection.

In some embodiments, the decision is made by a CN node that performs user plane session management.

In some embodiments, the signaling indicates whether or not the RAN node is allowed to overrule the decision by the CN by indicating whether the decision by the CN is a command that the RAN node must comply with or a preference that the RAN node is permitted to overrule.

Embodiments herein also includes a method for configuring user plane access stratum (AS) security in a wireless communication system that includes a radio access network (RAN) and a core network (CN). The method is performed by a CN node in the CN. The method comprises making a decision by the CN of whether or not a RAN node in the RAN is to activate user plane AS security. The method also comprises transmitting signaling that indicates the decision by the CN and that indicates whether or not the RAN node is allowed to overrule the decision by the CN.

In some embodiments, the method further comprises determining whether or not the RAN node is allowed to overrule the decision, based on and/or specifically for one or more of: a particular type of user plane AS security; a particular type or priority of service for which user plane traffic is to be communicated over user plane AS; a particular RAN node location or location type; a particular RAN node loading level; a particular type or priority of subscriber whose user plane traffic is to be communication over user plane AS; and a particular time or event.

In some embodiments, the signaling applies specifically for a particular user plane session and is transmitted during a procedure for establishing the user plane session for a particular wireless communication device.

In some embodiments, the decision is a decision of whether or not the RAN node is to activate user plane AS security in the form of user plane integrity protection or is a decision of whether or not the RAN node is to activate user plane AS security in the form of user plane confidentiality protection.

In some embodiments, the CN node is configured to perform user plane session management.

In some embodiments, the signaling indicates whether or not the RAN node is allowed to overrule the decision by the CN by indicating whether the decision by the CN is a command that the RAN node must comply with or a preference that the RAN node is permitted to overrule. Embodiments also include corresponding apparatus, computer programs, and carriers.

For example, embodiments include a radio access network (RAN) node for configuring user plane access stratum (AS) security in a wireless communication system that includes a RAN and a core network (CN). The RAN node is configured (e.g., via communication circuitry and processing circuitry) to receive, from the CN, signaling that indicates a decision by the CN of whether or not the RAN node is to activate user plane AS security and that indicates whether or not the RAN node is allowed to overrule the decision by the CN; and to activate or not activate user plane AS security, depending on the signaling.

Embodiments moreover include a core network (CN) node for configuring user plane access stratum (AS) security in a wireless communication system that includes a radio access network (RAN) and a core network (CN). The CN node is configured (e.g., via communication circuitry and processing circuitry) to make a decision by the CN of whether or not a RAN node in the RAN is to activate user plane AS security; and transmit signaling that indicates the decision by the CN and that indicates whether or not the RAN node is allowed to overrule the decision by the CN.

BRIEF DESCRIPTION OF THE DRAWINGS

FIG. 2A is a logic flow diagram of a method performed by a RAN node according to some embodiments.

FIG. 2B is a logic flow diagram of a method performed by a RAN node according to other embodiments.

FIG. 2C is a logic flow diagram of a method performed by a RAN node according to still other embodiments.

FIG. 3A is a logic flow diagram of a method performed by a CN node according to some embodiments.

FIG. 3B is a logic flow diagram of a method performed by a CN node according to other embodiments.

FIG. 3C is a logic flow diagram of a method performed by a CN node according to still other embodiments.

DETAILED DESCRIPTION

Figure 1:
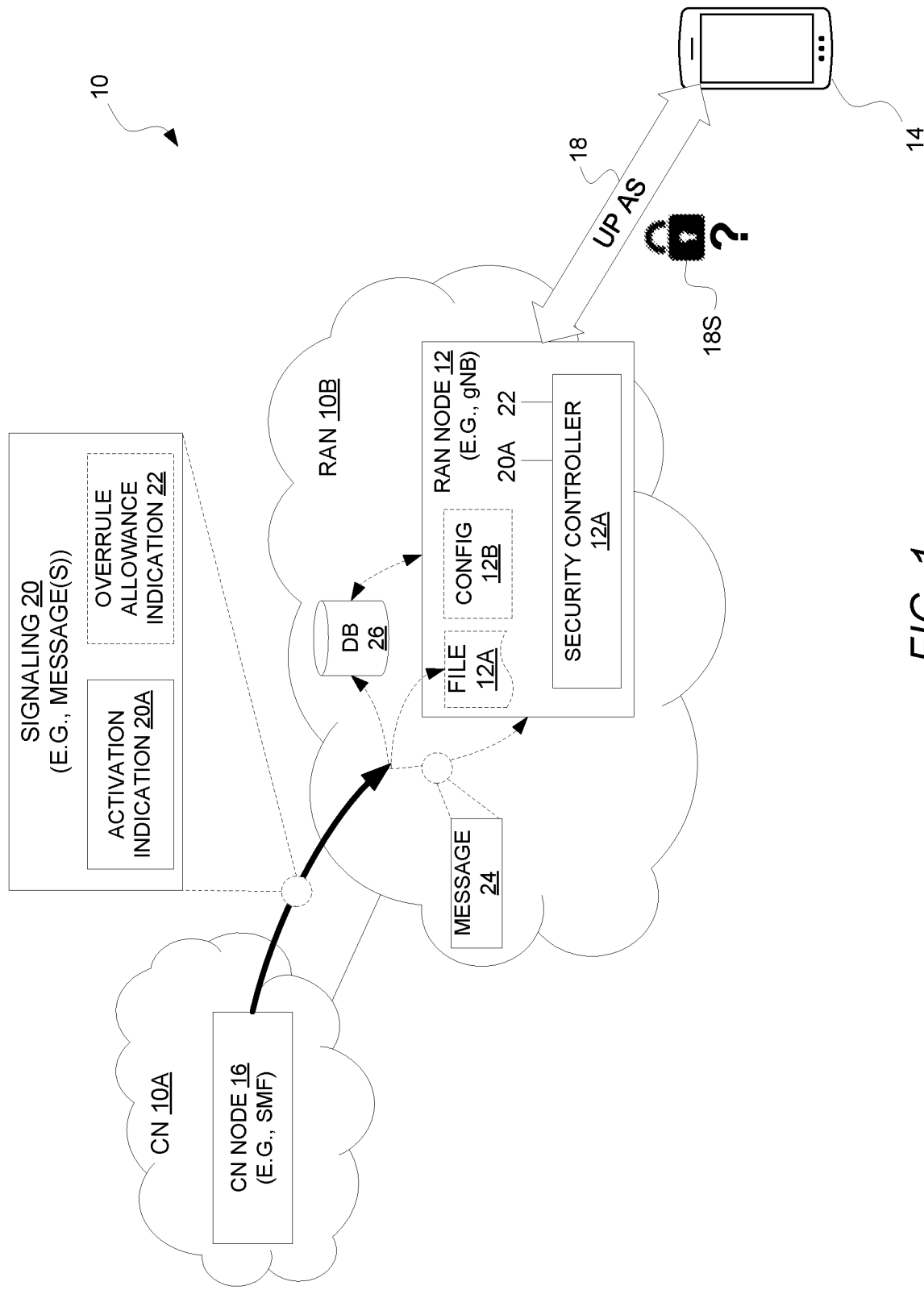
FIG. 1 is a block diagram of a wireless communication system according to some embodiments.

FIG. 1 shows a wireless communication system 10 (e.g., a 5G system) according to some embodiments. The system 10 includes a core network (CN) 10A and a radio access network (RAN) 10B. The RAN 10B includes one or more RAN nodes 12 (e.g., one or more base stations) for providing radio access to wireless communication devices 14, one of which is shown. Via this radio access, a wireless communication device 14 connects to the CN 10A, which in turn may provide the wireless communication device 14 with access to one or more external networks, such as the Internet. The CN 10A for example may include different CN nodes, such as a node implementing an access and mobility function, AMF, and a node implementing a session management function, SMF.

From a protocol structure standpoint, the system 10 is divided into an access stratum (AS) and a non-access stratum (NAS). The AS contains protocols that handle activities between the wireless communication device 14 and the RAN 10B, e.g., for transporting data over a radio connection and managing radio resources. The NAS contains protocols that handle activities between the wireless communication device 14 and the CN 10A, e.g., for establishing communication sessions and maintaining continuous communications as the wireless communication device 14 moves. The system 10 is also divided into a user plane (UP) and a control plane (CP). The control plane contains protocols responsible for managing transport bearers, whereas the user plane contains protocols responsible for transporting user traffic.

FIG. 1 in particular shows the user plane (UP) of the access stratum (AS) 18 as the part of the system 10 responsible for transporting user traffic between the wireless communication device 14 and the RAN 10B. The system 10 supports security 18S for protecting the UP AS 18, e.g., in the form of integrity protection and/or confidentiality protection (using encryption or ciphering). Activation or use of this UP AS security 18S however is optional in some embodiments, at least in the sense that there may be some conditions under which UP AS security 18S is allowed to be left deactivated (rather than the system 10 unconditionally mandating that UP AS security always be activated). With activation of UP AS security 18S being optional, a decision is made in the system 10 regarding whether or not to activate UP AS security 18S.

In particular, according to some embodiments herein, the CN 10A makes a decision of whether or not RAN node 12 is to activate UP AS security 18S, e.g., in the form of user plane integrity protection and/or confidentiality protection. FIG. 1 shows this decision as being made by a CN node 16, e.g., that performs user plane session management such as by implementing a session management function (SMF) in a 5G or New Radio (NR) CN. The CN node 16 performs signalling 20 to signal this decision directly or indirectly to the RAN 10B. In some embodiments, for instance, the CN node 16 signals an activation indication 20A that indicates the CN's decision of whether or not the RAN node 12 is to activate user plane AS security 18S. The RAN node 12 correspondingly obtains this activation indication 20A (e.g., by receiving the indication 20A from signalling 20) and uses the indication 20A to determine whether or not to activate UP AS security 18S. FIG. 1 for instance shows a security controller 12A of the RAN node 12 obtains the activation indication 20A and controls UP AS security activation based on the activation indication 20A.

Notably, though, the RAN node 12 also obtains an overrule allowance indication 22. The overrule allowance indication indicates whether or not the RAN node 12 is allowed (e.g., by the CN 10A) to overrule the activation decision by the CN 10A. In some embodiments, the CN 10A signals whether or not the RAN node 12 is allowed (e.g., by the CN 10A) to overrule the activation decision by the CN 10A, e.g., by signaling the overrule allowance indication 22 directly or indirectly to the RAN node 12. For example, the CN 10A may signal the overrule allowance indication 22 within a message 24 addressed or otherwise propagated to the RAN node 22 (e.g., together with the activation indication 20A). Alternatively, the CN 10A may signal the overrule allowance indication 22 by writing the indication 22 to a file 12A at or otherwise obtainable by the RAN node 12, by storing the indication 22 in a database (DB) 26 accessible to the RAN node 12, or the like. In these cases, then, the RAN node 12 obtains the overrule allowance indication 22 by receiving the indication 22 from message 24, reading the indication 22 from the file 12A, or fetching the indication 22 from the database 26. In still other embodiments, though, the overrule allowance indication 22 may be stored in a configuration 12B of the RAN node 12, e.g., such that the RAN node 12 is preconfigured with the overrule allowance indication 22. In this case, the RAN node 12 obtains the overrule allowance indication by retrieving it from configuration 12B.

In any event, the security controller 12A of the RAN node 12 may activate or not activate UP AS security 18S, depending on the CN's decision and on whether or not the RAN node 12 is allowed to overrule that decision, e.g., depending on the activation indication 20A and the overrule allowance indication 22. For example, if the overrule allowance indication 22 indicates the RAN node 12 is not allowed to overrule the CN's decision, the RAN node 12 may unconditionally follow that decision so as to activate or not activate UP AS security 18S in accordance with the CN's decision (e.g., provided the RAN node 12 is able to do so). But if the overrule allowance indication 20B indicates the RAN node 12 is allowed to overrule the CN's decision, the RAN node 12 is configured to autonomously choose whether or not to activate the UP AS security 18S, e.g., taking the CN's decision into account as well as other information available locally at the RAN node 12.

Some embodiments therefore effectively enable (e.g., via the overrule allowance indication 22) the system 10 to select between (i) absolutely enforcing the CN's decision as a command that the RAN node 12 must comply with, e.g., as a condition for the RAN node 12 to serve a user plane session; and (ii) flexibly offering the CN's decision as a request or preference that the RAN node 12 may simply take into account, e.g., along with other information available locally at the RAN node 12. That is, the CN 10A may centrally maintain absolute control over user plane AS security activation or defer/distribute at least some of that control to the RAN node 12. The system 10 may for example not allow the RAN node 12 to overrule the CN's security activation decision if information in the CN 10A suggests that the CN's decision should trump or outweigh any input the RAN node 12 might have on the desirability or feasibility of security activation. In these and other contexts, therefore, some embodiments herein advantageously configure user plane AS security 18S in a robust way that flexibly distributes security activation decision-making amongst the CN 10A and RAN 10B as needed to account for information available locally in the CN 10A and RAN 10B, while strictly centralizing security activation decision-making to the CN 10A when needed to absolutely prioritize information available in the CN 10A.

More particularly in some embodiments, the CN's decision and/or whether the decision can be overruled (e.g., one or both of the indications 20A, 20B) may be configured (e.g., by the CN node 16) based on certain network policy rules and/or subscription policy rules, e.g., which may be available to the CN 10A but not the RAN 10B. These rules may specify that CN's decision and/or whether the decision can be overruled (e.g., the indications 20A, 20B) are to be set based on certain information. Where set by the CN node 16, this certain information may be available at the CN node 16 (but not the RAN 10B).

The information may concern for instance the sensitivity, type, or priority of user plane traffic to be communicated over the UP AS 18. For example, if the user plane traffic is deemed highly sensitive or high priority, the indications 20A, 20B may indicate that the CN 10A has decided to activate UP AS security 18S and that the RAN node 12 is not allowed to override the CN's decision. But if the user plane traffic is less sensitive or lower priority, the overrule allowance indication 20B may indicate that the RAN node 12 is allowed to override the CN's decision.

Similarly, the information may concern the type or priority of service for which user plane traffic is to be communicated over the UP AS 18. For example, if user plane traffic is to be communicated for an internet of things (IoT) service, the indications 20A, 20B may indicate that the CN 10A has decided to activate UP AS security 18S and that the RAN node 12 is not allowed to override the CN's decision. But if the user plane traffic is to be communicated for a video service, the overrule allowance indication 20B may indicate that the RAN node 12 is allowed to override the CN's decision.

In still other embodiments, the information may alternatively or additionally concern the type or priority of subscriber(s) whose user plane traffic is to be communicated over the UP AS 18. For example, if the subscriber whose user plane traffic is to be communicated over the UP AS 18 is the President of a nation, the indications 20A, 20B may indicate that the CN 10A has decided to activate UP AS security 18S and that the RAN node 12 is not allowed to override the CN's decision. But if the subscriber whose user plane traffic is to be communicated over the UP AS 18 is a public subscriber, the overrule allowance indication 20B may indicate that the RAN node 12 is allowed to override the CN's decision.

Alternatively or additionally, the information may concern the particular time or event during which user plane traffic is to be communicated over the UP AS 18. For example, if user plane traffic is to be communicated over the UP AS 18 during a nation's elections, the indications 20A, 20B may indicate that the CN 10A has decided to activate UP AS security 18S and that the RAN node 12 is not allowed to override the CN's decision. But if user plane traffic is to be communicated over the UP AS 18 during the Olympic games or some other less prioritized event, the overrule allowance indication 20B may indicate that the RAN node 12 is allowed to override the CN's decision.

In yet other embodiments, the information may concern the particular location or type of location of the RAN node 12. For example, if the RAN node 12 is located in a public area or some other less secure location, the indications 20A, 20B may indicate that the CN 10A has decided to activate UP AS security 18S and that the RAN node 12 is not allowed to override the CN's decision. But if the RAN node 12 is located in a physically secluded premises or some other more secure location, the overrule allowance indication 20B may indicate that the RAN node 12 is allowed to override the CN's decision.

If the RAN node 12 is allowed to override the CN's decision, the RAN node 12 may itself take certain information into account in autonomously deciding whether or not to activate UP AS security 18S. This information may concern for instance the ability or desirability of the RAN node 12 to activate UP AS security. For example, the information may reflect the impact of security activation on the loading level of the RAN node 12, the power efficiency or availability at the RAN node 12, or on the loading, efficiency, or availability of radio resource usage in the RAN 10B. In some embodiments, for instance, the RAN node 12 may choose not to activate UP AS security 18S if a high loading level or low availability level of power at the RAN node 16 or radio resources in the system 10 suggests that such activation is not possible or desirable. In a particular example, then, the RAN node 12 may be configured to not activate UP AS security 18S when the RAN node's loading level reaches a certain level deemed as overload, e.g., due to serving a large number of wireless communication devices at the same time. In this case, the RAN node 12 prioritizes computational efficiency over UP AS security 18S when the overrule allowance indication 20B permits the RAN node 12 to do so.

Alternatively or additionally, the information may concern a mode of the RAN node 12, such as a power-saving mode, in which the RAN node 12 may avoid activating UP AS security 18S. For example, where the RAN node 12 is operating in a power-saving mode, the RAN node 12 may not activate UP AS security 18S so as to prioritize battery efficiency over UP AS security 18S when the overrule allowance indication 20B permits the RAN node 12 to do so.

In yet other embodiments, the information may concern authorization of the CN 10A to activate user plane AS security 18S. For example, in some embodiments where the CN 10A and RAN 10B are owned and operated by different parties, multiple core networks may share the same RAN 10B. This may mean that the RAN-party selling RAN services has agreed to different policies with each of the CN parties operating core networks, and some CN-parties may not be authorized by the RAN-party to activate UP AS security. Accordingly, the RAN node 12 may not activate user plane AS security 18S if the CN 10A is not authorized to activate it, e.g., irrespective of the overrule allowance indication 22.

No matter the particular information at the CN 10A and RAN 10B, the CN node 16 and/or RAN node 16 may perform one or more actions when the decision by the CN 10A is that the RAN node 16 is to activate user plane AS security 18S, when according to the overrule allowance indication 20B the RAN node 16 is not allowed to overrule the decision by the CN 10A, and when the RAN node 16 is not able (or the CN 10A is not authorized) to activate UP AS security 18S. The action(s) may for instance include canceling, rejecting, or dropping a user plane session or user plane session establishment. This effectively enforces compliance with the CN's decision to activate UP AS security 18S, or compliance with a requirement that such security 18S be authorized, with failure to comply resulting in the cancellation, rejection, or dropping of a UP session or UP session establishment. This may be based on the rationale that an insecure UP AS (or a secure but unauthorized UP AS) is more detrimental than no UP AS at all.

In an effort to salvage the UP session, though, the action(s) may alternatively (or first) include steering a wireless communication device to a different RAN node. For example, where a wireless communication device 14 has established or is establishing a user plane session with the RAN node 12, the RAN node 12 may transmit signaling to the device 14 that steers the device 14 to a different RAN node for establishing a user plane session with that different RAN node instead. The signaling in some embodiments includes a reason indication that indicates the reason for the steering (e.g., inability or undesirability of UP AS activation at the RAN node 16). Provided with such a reason, the device 14 may decide whether to connect to the other RAN node, or just proceed with the RAN node 12 without UP AS security. Regardless, the RAN node 12 in some embodiments selects the different RAN node based on certain information similar to that described above but with respect to the different RAN node, i.e., so as to characterize the ability or desirability of the different RAN node to activate UP AS security. For example, the RAN node 12 may select the different RAN node based on information describing the impact of security activation on the loading level of the different RAN node, the power efficiency or availability at the different RAN node, or the like, e.g., so as to select another RAN node that is better able or otherwise positioned to activate UP AS security.

At least some embodiments, then, advantageously ensure that UP AS security 18S is selectively activated or deactivated in a way that holistically accounts for relevant information distributed throughout the system 10 between the CN 10A and RAN 10B. This may in turn ensure that UP AS security 18S is activated for user plane traffic, services, or subscribers that are important enough to justify mandating that activation, but at the same time allow the RAN 10B under some circumstances to forego activation in favor of controlling its loading, radio resource usage, power efficiency, or the like.

Note that the CN's decision and/or whether the decision can be overruled (e.g., the activation indication 20A and/or the overrule allowance indication 22) in some embodiments are set or are applicable specifically for a particular user plane session, i.e., on a UP session specific basis. For example, in some embodiments, the CN decides whether or not to activate UP AS security 18S for a particular UP session and also signals whether the RAN node 16 is allowed to overrule that decision for the particular UP session. In fact, in these and other embodiments, the CN node 16 may signal the overrule allowance indication 22 to the RAN node 12 during a procedure for establishing a UP session for a particular wireless communication device 14 (e.g., within a packet data unit, PDU, session establishment procedure or message). The overrule allowance indication 22 and the activation indication 20A may even be included in the same message signalled towards the RAN 10B. In these and other embodiments, then, the overrule allowance indication 22 may be specific to the activation indication 20A so as to indicate whether or not the CN 10A allows the RAN node 16 to overrule the decision indicated specifically by the activation indication 20A.

In other embodiments, by contrast, the CN's decision and/or whether the decision can be overruled (e.g., the activation indication 20A and/or the overrule allowance indication 22) in some embodiments are set or are applicable for a particular category of user plane sessions, for any user plane session managed by a particular CN node, and/or for any user plane session associated with a particular network slice. In these and other embodiments, the activation indication 20A and/or the overrule allowance indication 22 may be signalled by the CN 10A, obtained by the RAN node 12, and/or preconfigured at the RAN node 12 in advance of establishment of a particular user plane session for which UP AS security 18S is activated or deactivated depending on those indications 20A, 22. The indication(s) 20A, 22 may for instance specify certain conditions under which the indication(s) apply, e.g., so as to form a granular policy for their application. For example, the overrule allowance indication 22 may specify that it applies for a particular type of UP AS security (e.g., confidentiality, but not integrity, protection), for a particular time period (e.g., Sundays), for a particular loading level of the RAN node 16 (e.g., when the number of connected wireless communication devices 14 exceeds 10,000), or the like. In these and other examples, then, the RAN node 16 may evaluate whether or which indications 20A, 22 apply for determining whether UP AS security 18S is to be activated for a particular UP session, a particular category of UP sessions, or the like.

Further note that in some embodiments whether UP AS security 18S is activated refers to whether UP AS security 18S is applied by the RAN node 12 with any type of algorithm, whether that algorithm is a non-null algorithm or a null algorithm that does not encrypt or integrity protect in practice. In these and other embodiments, the overrule allowance indication 22 may be set based on whether UP AS security 18S will be activated with a null or non-null algorithm, e.g., so as to not allow the RAN node 16 to overrule the CN's decision if the RAN node 16 simply activates with a null algorithm. In other embodiments, though, whether UP AS security 18S is activated refers to whether UP AS security 18S is applied by the RAN node 12 with a non-null algorithm, i.e., whether UP AS security 18S is activated in a way that actually encrypts and/or integrity protects in practice.

In view of the above modifications and variations, FIG. 2A shows a method 100 performed by RAN node 16 for configuring UP AS security 18S in accordance with some embodiments. The method 100 includes obtaining an activation indication 20A that indicates a decision by the CN 10A of whether or not the RAN node 16 is to activate user plane AS security 18S (Block 102). The method 100 also includes obtaining an overrule allowance indication 22 that indicates whether or not the RAN node is allowed (e.g., by the CN 10A) to overrule the decision by the CN 10A (Block 104).

In some embodiments, the method 100 further includes activating or not activating UP AS security 18S, depending on the activation indication 20A and the overrule allowance indication 22 (Block 106). Alternatively or additionally, the method 100 may further include performing one or more actions when the decision by the CN 10A is that the RAN node 16 is to activate user plane AS security 18S, when according to the overrule allowance indication 22, the RAN node 16 is not allowed to overrule the decision by the CN 10A, and when the RAN node 16 is not able, or the CN 10A is not authorized, to activate user plane AS security 18S (Block 108). For example, the action(s) may include canceling, rejecting, or dropping a user plane session or user plane session establishment, or steering a wireless communication device 14 to a different RAN node.

FIG. 3A correspondingly shows a method 200 performed by CN node 16 for configuring UP AS security 18S according to some embodiments. The method 200 includes signaling an activation indication 20A that indicates a decision by the CN 10A of whether or not the RAN node 16 is to activate user plane AS security 18S (Block 202). The method 200 also includes signaling an overrule allowance indication 22 that indicates whether or not the RAN node is allowed (e.g., by the CN 10A) to overrule the decision by the CN 10A (Block 204).

In some embodiments, the method 200 may further include performing one or more actions when the decision by the CN 10A is that the RAN node 16 is to activate user plane AS security 18S, when according to the overrule allowance indication 22, the RAN node 16 is not allowed to overrule the decision by the CN 10A, and when the RAN node 16 is not able, or the CN 10A is not authorized, to activate user plane AS security 18S (Block 206). For example, the action(s) may include increasing resources available at the RAN node for user plane AS security and/or modifying the decision and/or the overrule allowance indication to allow a user plane session to be established without user plane AS security (rather than the user plane session being canceled, rejected, or dropped).

FIG. 2B shows a method 110 performed by RAN node 16 for configuring UP AS security 18S in accordance with other embodiments where the signaling 20 indicates the CN's decision and whether the decision can be overruled. The method 110 includes receiving signaling 20 that indicates a decision by the CN 10A of whether or not the RAN node 16 is to activate user plane AS security 18S and that indicates whether or not the RAN node is allowed (e.g., by the CN 10A) to overrule the decision by the CN 10A (Block 112).

In some embodiments, the method 110 further includes activating or not activating UP AS security 18S, depending on the signaling 20 (Block 114). Alternatively or additionally, the method 110 may further include performing one or more actions when the decision by the CN 10A is that the RAN node 16 is to activate user plane AS security 18S, when the RAN node 16 is not allowed to overrule the decision by the CN 10A, and when the RAN node 16 is not able, or the CN 10A is not authorized, to activate user plane AS security 18S (Block 116). For example, the action(s) may include canceling, rejecting, or dropping a user plane session or user plane session establishment, or steering a wireless communication device 14 to a different RAN node.

FIG. 3B correspondingly shows a method 210 performed by CN node 16 for configuring UP AS security 18S according to some embodiments. The method 210 includes making a decision (of the CN) of whether or not the RAN node 16 is to activate UP AS security (Block 212). The method 210 further includes transmitting signaling 20 that indicates a decision by the CN 10A of whether or not the RAN node 16 is to activate user plane AS security 18S and that indicates whether or not the RAN node is allowed (e.g., by the CN 10A) to overrule the decision by the CN 10A (Block 214).

In some embodiments, the method 210 may further include performing one or more actions when the decision by the CN 10A is that the RAN node 16 is to activate user plane AS security 18S, when the RAN node 16 is not allowed to overrule the decision by the CN 10A, and when the RAN node 16 is not able, or the CN 10A is not authorized, to activate user plane AS security 18S (Block 216). For example, the action(s) may include increasing resources available at the RAN node for user plane AS security and/or modifying the decision and/or the overrule allowance indication to allow a user plane session to be established without user plane AS security (rather than the user plane session being canceled, rejected, or dropped).

FIG. 2C shows a method 120 performed by RAN node 16 for configuring UP AS security 18S in accordance with still other embodiments. The method 120 includes receiving signaling 20 that indicates whether a decision by the CN 10A to activate or not user plane AS security 18S is a command that the RAN node 16 must comply with or a preference that the RAN node 16 is permitted to overrule (Block 122).

In some embodiments, the method 120 further includes activating or not activating UP AS security 18S, depending on the signaling 20 (Block 124). Alternatively or additionally, the method 110 may further include performing one or more actions when the decision by the CN 10A is that the RAN node 16 is to activate user plane AS security 18S, when the RAN node 16 is not allowed to overrule the decision by the CN 10A, and when the RAN node 16 is not able, or the CN 10A is not authorized, to activate user plane AS security 18S (Block 126). For example, the action(s) may include canceling, rejecting, or dropping a user plane session or user plane session establishment, or steering a wireless communication device 14 to a different RAN node.

FIG. 3C correspondingly shows a method 220 performed by CN node 16 for configuring UP AS security 18S according to other embodiments. The method 220 includes making a decision (of the CN) of whether or not the RAN node 16 is to activate UP AS security (Block 222). The method 220 further includes transmitting signaling 20 that indicates whether a decision by the CN 10A to activate or not user plane AS security 18S is a command that the RAN node 16 must comply with or a preference that the RAN node 16 is permitted to overrule (Block 224).

In some embodiments, the method 220 may further include performing one or more actions when the decision by the CN 10A is that the RAN node 16 is to activate user plane AS security 18S, when the RAN node 16 is not allowed to overrule the decision by the CN 10A, and when the RAN node 16 is not able, or the CN 10A is not authorized, to activate user plane AS security 18S (Block 226). For example, the action(s) may include increasing resources available at the RAN node for user plane AS security and/or modifying the decision and/or the overrule allowance indication to allow a user plane session to be established without user plane AS security (rather than the user plane session being canceled, rejected, or dropped).

Figure 4:
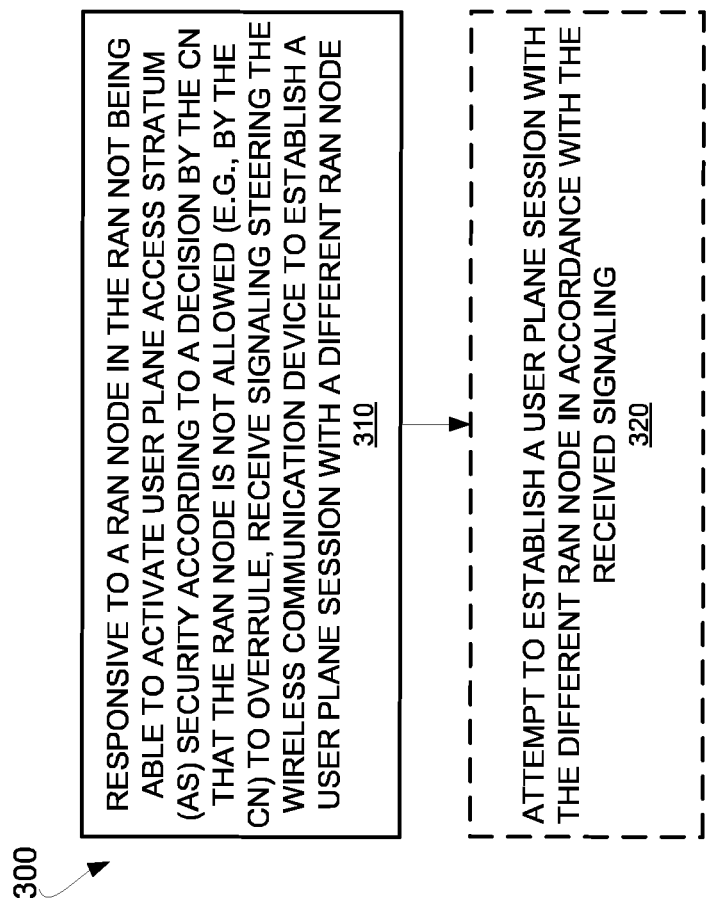
FIG. 4 is a logic flow diagram of a method performed by a wireless device according to some embodiments.

FIG. 4 shows a method 300 performed by a wireless communication device 14 according to some embodiments. The method 300 includes, responsive to a RAN node 16 in the RAN 10B not being able to activate UP AS security 18S according to a decision by the CN 10A that the RAN node is not allowed (e.g., by the CN 10A) to overrule, receive signaling steering the wireless communication device 14 to establish a user plane session with a different RAN node (Block 310). The method 300 in some embodiments may also include attempting to establish a user plane session with the different RAN node in accordance with the received signaling (Block 320).

Note further that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

A core network node 16 as described above may implement an access and mobility function (AMF) and/or a session management function (SMF) at least in some embodiments. Regardless, core network node 16 may perform any of the processing herein by implementing any functional means or units. In one embodiment, for example, core network node 16 comprises respective circuits or circuitry configured to perform any of the steps shown in FIG. 3. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 5A:
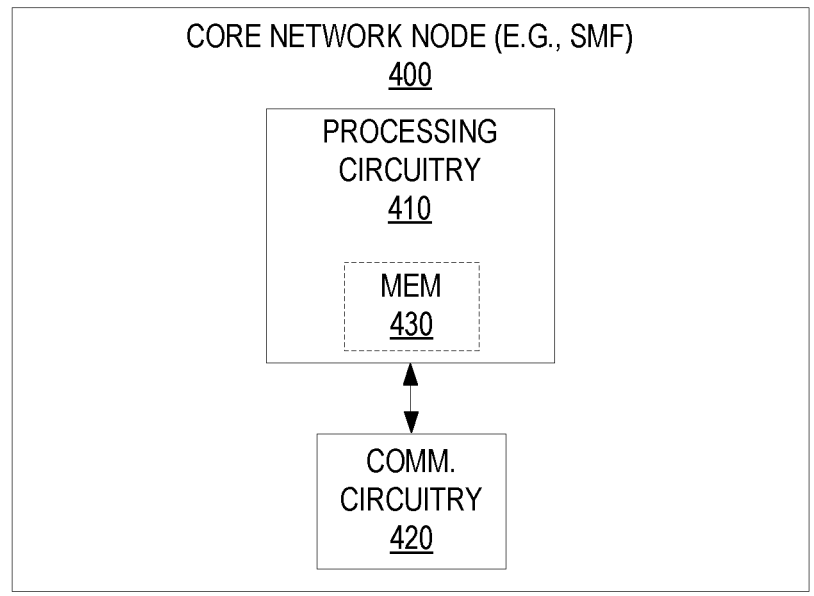
FIG. 5A is a block diagram of a CN node according to some embodiments.

FIG. 5A illustrates core network node 400 in accordance with one or more embodiments. The core network node 400 may correspond for instance to core network node 16 discussed herein as performing signaling 20 and/or other processing herein. Regardless, as shown, the core network node 400 includes processing circuitry 410 and communication circuitry 420. The communication circuitry 420 is configured to transmit and/or receive information to and/or from one or more other nodes, e.g., via any communication technology. The processing circuitry 410 is configured to perform processing described above, e.g., in FIGS. 3A, 3B, and/or 3C, such as by executing instructions stored in memory 430. The processing circuitry 410 in this regard may implement certain functional means, units, or modules.

Figure 5B:
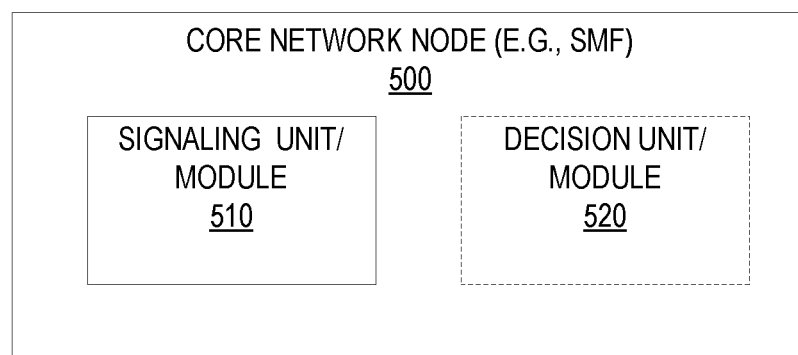
FIG. 5B is a block diagram of a CN node according to other embodiments.

FIG. 5B illustrates core network node 500 implemented in accordance with one or more other embodiments. The core network node 500 may correspond for instance to core network node 16 discussed herein as performing signaling 20 and/or other processing herein. Regardless, as shown, the core network node 500 implements various functional means, units, or modules, e.g., via the processing circuitry 410 in FIG. 5A and/or via software code. These functional means, units, or modules, e.g., for implementing any of the steps in FIGS. 3A, 3B, and/or 3C, include for instance a signaling unit or module 510 for transmitting signaling 20. In some embodiments, e.g., for implementing the method 100 in FIG. 3A, the signaling unit or module 510 is for signaling an activation indication 20A that indicates a decision by the CN 10A of whether or not the RAN node 16 is to activate user plane AS security 18S, and for signaling an overrule allowance indication 22 that indicates whether or not the RAN node is allowed (e.g., by the CN 10A) to overrule the decision by the CN 10A. Also included may be a decision unit or module 520 for making the decision of whether or not the RAN node 16 is to activate UP AS security 18S and/or for deciding whether or not the RAN node 16 is allowed to overrule that decision.

Similarly, radio network equipment as described above may perform any of the processing herein by implementing any functional means or units. In one embodiment, for example, the radio network equipment comprises respective circuits or circuitry configured to perform any of the steps shown in any of FIGS. 2A-2C. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 6A:
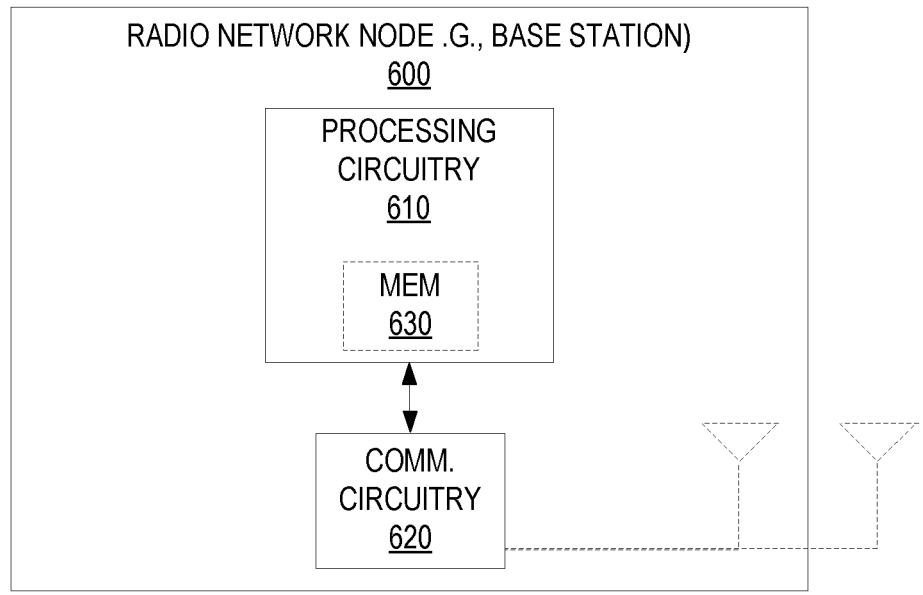
FIG. 6A is a block diagram of a RAN node according to some embodiments.

FIG. 6A illustrates radio network node 600 in accordance with one or more embodiments. The radio network node 600 may correspond to radio network node 12 described in FIG. 1. As shown, the radio network node 600 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIGS. 2A, 2B, and/or 2C, such as by executing instructions stored in memory 630. The processing circuitry 610 in this regard may implement certain functional means, units, or modules.

Figure 6B:
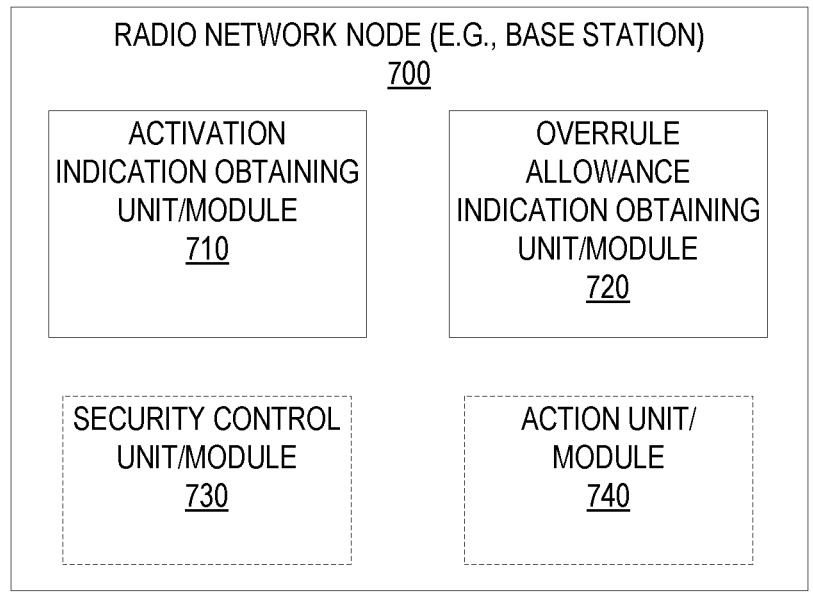
FIG. 6B is a block diagram of a RAN node according to other embodiments.

FIG. 6B illustrates a radio network node 700 implemented in accordance with one or more other embodiments. The radio network node 700 may correspond to radio network node 12 described in FIG. 1. As shown, the radio network node 700 implements various functional means, units, or modules, e.g., via the processing circuitry 610 in FIG. 6A and/or via software code. These functional means, units, or modules, e.g., for implementing any of the steps in FIG. 2A, include for instance an obtaining unit or module 1010 for obtaining an activation indication 20A that indicates a decision by the CN 10A of whether or not the RAN node 16 is to activate user plane AS security 18S, and an overrule allowance indication obtaining unit or module 720 for obtaining an overrule allowance indication 22 that indicates whether or not the RAN node is allowed (e.g., by the CN 10A) to overrule the decision by the CN 10A. Also included may be a security control unit or module 730 for activating or deactivating UP AS security 18S, depending on the activation indication 20A and the overrule allowance indication 22. Further included may be an action unit or module 740 for performing one or more actions when the decision by the CN 10A is that the RAN node 16 is to activate user plane AS security 18S, when according to the overrule allowance indication 22, the RAN node 16 is not allowed to overrule the decision by the CN 10A, and when the RAN node 16 is not able, or the CN 10A is not authorized, to activate user plane AS security 18S.

Figure 7A:
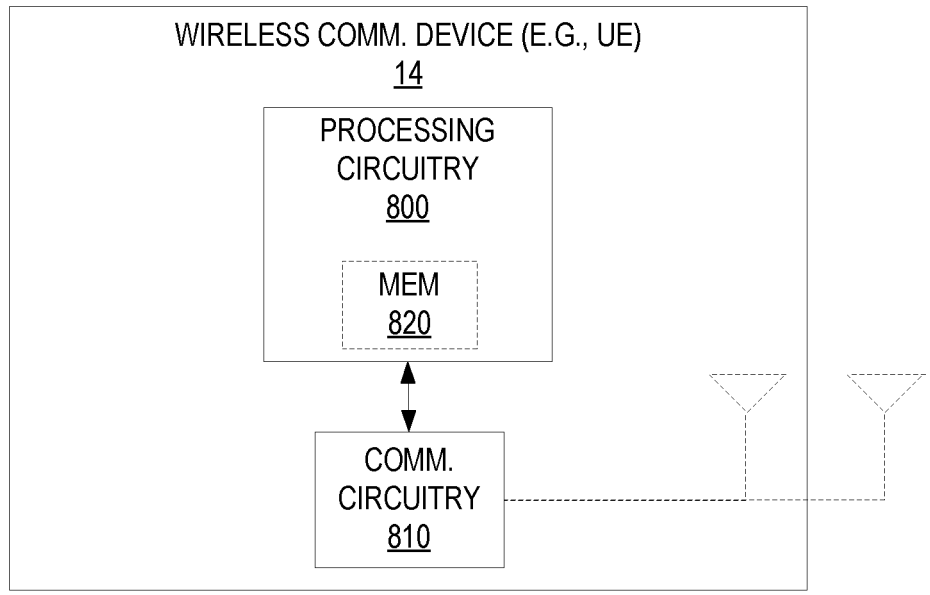
FIG. 7A is a block diagram of a wireless device according to some embodiments.

FIG. 7A illustrates a wireless communication device 14 (e.g., UE) as implemented in accordance with one or more embodiments. As shown, the wireless communication device 14 includes processing circuitry 800 and communication circuitry 810. The communication circuitry 810 (e.g., radio circuitry) is configured to transmit and/or receive information to and/or from one or more other nodes, e.g., via any communication technology. Such communication may occur via one or more antennas that are either internal or external to the wireless communication device 14. The processing circuitry 800 is configured to perform processing described above, such as by executing instructions stored in memory 820. The processing circuitry 800 in this regard may implement certain functional means, units, or modules.

Figure 7B:
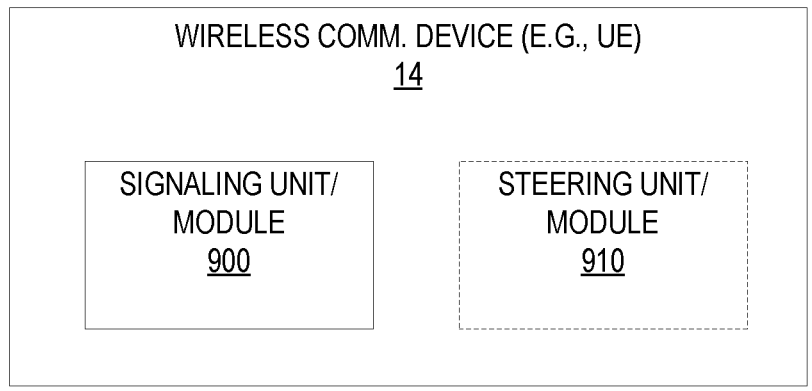
FIG. 7B is a block diagram of a wireless device according to other embodiments.

FIG. 7B illustrates a schematic block diagram of wireless communication device 14 according to still other embodiments. As shown, the wireless communication device 14 implements various functional means, units, or modules, e.g., via the processing circuitry 800 in FIG. 7A and/or via software code. These functional means, units, or modules, e.g., for implementing the method(s) herein, include for instance a signalling unit or module 900 for receiving signalling steering the wireless communication device 14 to establish a user plane session with a different RAN node. Also included may be a steering unit or module 910 for attempting to establish a user plane session with the different RAN node in accordance with the received signaling.

Those skilled in the art will also appreciate that embodiments herein further include corresponding computer programs.

A computer program comprises instructions which, when executed on at least one processor of an apparatus configured for use in a wireless communication system, cause the apparatus carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by an apparatus. This computer program product may be stored on a computer readable recording medium.

Although embodiments above have been described with respect to user plane AS security, the embodiments may equally extend to other types of AS security, e.g., control plane AS, to the extent that the other types of AS security are optional so as to require a decision regarding their activation.

Additional embodiments will now be described. At least some of these embodiments may be described as applicable in certain contexts and/or wireless network types (e.g., 5G) for illustrative purposes, but the embodiments are similarly applicable in other contexts and/or wireless network types not explicitly described. Accordingly, the embodiments below may be particular examples of and/or otherwise combinable with the embodiments above.

Figure 8:
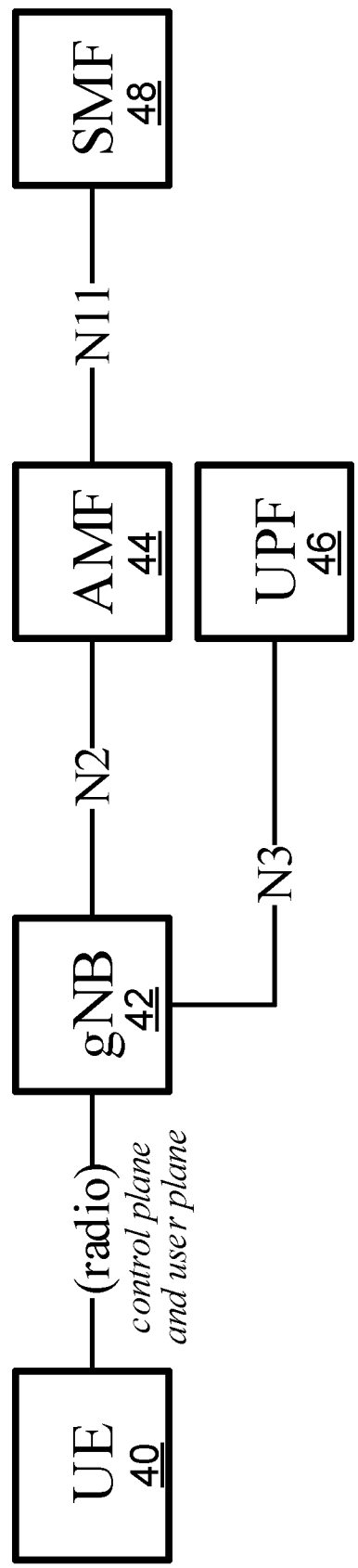
FIG. 8 is a block diagram of a 5G network according to some embodiments.

The 3GPP TS 23.501 describes the 5G network architecture. A stripped-down simplified version of a 5G network is shown in FIG. 8.

The UE (User Equipment) 40 is a mobile device used by the user to wirelessly access the network. The UE 40 may for instance represent the wireless device 14 of FIG. 1 as implemented for a 5G network. The radio access network (RAN) function or base station called gNB (Next Generation Node B) 42 is responsible for providing wireless radio communication to the UE and connecting the UE to the core network. The gNB 42 may for instance represent the RAN node 12 of FIG. 1 as implemented for a 5G network. The core network function called AMF (Access and Mobility Management Function) 44 is responsible for handling the mobility of the UE, among other responsibilities. Another core network function called SMF (Session Management Function) 48 is responsible for handling the session and traffic steering of the UE, among other responsibilities. The SMF 48 may represent the CN node 16 of FIG. 1 as implemented for a 5G network. Yet another core network function called UPF (User Plane Function) 46 is responsible for interconnecting to data network, packet routing and forwarding, among other responsibilities.

The UE 40 interacts with the gNB 42 over-the-air using radio interface. The radio interface traffic comprises of both control plane traffic and user plane traffic. The radio control plane is also called RRC (Radio Resource Control). The gNB 42 in turn interacts with the AMF 44 using the interface called the N2. The interface between the AMF 44 and the SMF 48 is called the N11. Similarly, the gNB 42 and the UPF 46 interact using the interface called the N3. There is no direct interface between the gNB 42 and the SMF 48, therefore, they interact via the AMF 44.

The logical aspects between the UE 40 and the AMF 44 are referred to as NAS (non-access stratum) and that between the UE 40 and the gNB 42 is referred to as AS (access stratum). Correspondingly, the security of communication (control plane and user plane, if applicable) are referred to as NAS security and AS security, respectively. The AS security comprises of confidentiality and integrity protection of both the control plane (i.e., the RRC) and the user plane traffic.

In the LTE system (Long Term Evolution, which is popularly known as 4G), the AS security is mandatory for both the RRC and the user plane. It means that both the confidentiality and the integrity protection are activated for the RRC and the confidentiality is activated for the user plane. There is no support for the integrity protection of user plane in LTE. Mind that there are null-encryption and null-integrity algorithms in LTE which do not encrypt and integrity protect the RRC or user plane traffic in practice. But according to some embodiments, these null algorithms are just another kind of algorithm and therefore the AS security is still said to be activated, i.e., activated using null algorithms.

In the 5G system, the AS security is mandatory for the RRC but it is likely to be optional for the user plane. It means that that both the confidentiality and the integrity protection will be activated for the RRC; however, the confidentiality and the integrity protection will likely be optional for the user plane.

In the LTE system, since AS security activation is mandatory for both the RRC and the user plane traffic, it is sufficient to have a single procedure that activates AS security for both the RRC and the user plane traffic. That procedure is known as AS security mode command procedure (see Clause 7.2.4.5 in 3GPP TS 33.401). This will be likely be no longer the case in the 5G system, because the AS security activation is optional for the user plane traffic. It is unclear whether AS security mode command procedure is the right procedure for user plane AS security activation or not, and if not, what the right procedure is and which node or function is responsible for the same. Therefore, activation of AS security brings in new challenge to the 5G system.

Some embodiments herein provide a mechanism where the user plane AS security (i.e., confidentiality and integrity protection) is activated as intended. The embodiments may provide a robust mechanism for user plane AS security activation. The robustness is introduced by protecting from a situation where user plane AS security is not activated even though a decision to activate user plane AS security has been made.

Generally, then, embodiments herein may address a challenge that, when the CN sends an indication to the RAN that the user plane AS security is to be activated, the RAN may not be able to comply for reasons, such as e.g., currently being overloaded or in power saving mode and not being able to activate integrity protection or confidentiality for the sake of computational or battery efficiency, etc. Some embodiments propose that the RAN may overrule the decision made by the CN on activating user plane AS security, only if allowed to do so by the CN.

The reasons for such embodiments follow. The CN, and not the RAN, has access to the network policy rules or subscription policy rules based on which the CN takes the decision on whether to activate user plane AS security or not. Therefore, the RAN is not in the position to decide on its own if the CN's decision can be overruled or not. For example, if the CN has decided to activate user plana AS security for UEs belonging to law enforcement, it would be devastating if the RAN, just based on its local condition, overrules the CN's decision and does not activate user plane AS security. Further, it is also not sufficient that the RAN informs the CN that the CN's decision was overruled by the RAN. The CN will get the information that the user plane AS security activation was not activated, but it may be too late before the CN can take any corrective action, e.g. uplink/downlink data already sent over-the-air. In other words, the damage could already happen before the CN makes further decision. Therefore, some embodiments seem it only acceptable that the CN has the final say on whether its decision can be overruled by the RAN or not. This could be done in many ways, e.g., the CN sends an indication (overrule allowed or not) to the RAN along with the decision to activate user plane AS security, the CN sends an indication (overrule allowed or not) to the RAN at the NGAP intial context setup between the RAN and the CN, the RAN being preconfigured with an indication (overrulue allowed or not for certain type of sessions or UEs), etc.

For example, a method performed by a gNB 42 for setting up a user plane access stratum (AS) security may comprise in some embodiments: (i) Obtaining a donotOverrule indication from a SMF 48, which indicates whether or not the gNB 42 is allowed to overrule a first indication, i.e., the SMF's indication for user plane AS security activation; (ii) Obtaining the first indication from the SMF 48, which is the SMF's indication for user plane AS security activation; and (iii) Determining based on the donotOverrule indication whether or not to overrule the first indication.

In some embodiments, the method may further comprise determining that the first indication cannot be complied with.

Alternatively or additionally, the donotOverrule indication and the first indication may be obtained together. For example, the donotOverrule indication and the first indication may be collectively indicated by a combined indication that both indicates the SMF's indication for user plane AS security activation and indicates whether or not the gNB 42 is allowed to overrule the first indication.

In some embodiments, the method may further comprise taking action.

In more detail, mind that besides the gNB 42, the RAN in 5G will also consist of next generation eNB (ng-eNB), an eNB (E-UTRAN NodeB or Evolved NodeB) meaning base stations belonging to LTE. However, such distinction is not highly important for purposes of this disclosure and therefore the disclosure refers only to the gNB 42. This is done for clarity of the description rather than for limiting embodiments herein. Also mind that the user plane AS security comprises of user plane confidentiality and user plane integrity protection. However, such distinction is not highly important for purposes of this disclosure and therefore the disclosure will generally refer to the user plane AS security, for clarity of the description rather than for limiting embodiments herein. Further, the term node may denote a physical node or a function in the network.

As discussed earlier, in 5G system, the user plane AS security activation is likely to be optional. The first challenge in the activation of the user plane AS security is the decision of which node is in control of the activation. Since the user plane AS security is terminated in the gNB 42, the gNB 42 is in control of the activation according to some embodiments. However, the gNB 42 is a RAN node and does not have access to the network policy rules or subscription policy rules which reside in the core network. Therefore, the gNB 42 cannot be the node which decides whether user plane AS security for a particular UE 40 is to be activated or not. The SMF 48 on the other hand is a core network node and has access to the policy rules. The SMF 48 is also the node responsible for user plane session management. Therefore, the SMF 48 according to some embodiments is the node which decides whether user plane AS security for a particular UE 40 is to be activated or not. Although the SMF 48 is referred to in the described embodiments, some other core network node, e.g., the AMF 46, may instead decide the user plane AS security activation in other embodiments.

Figure 9:
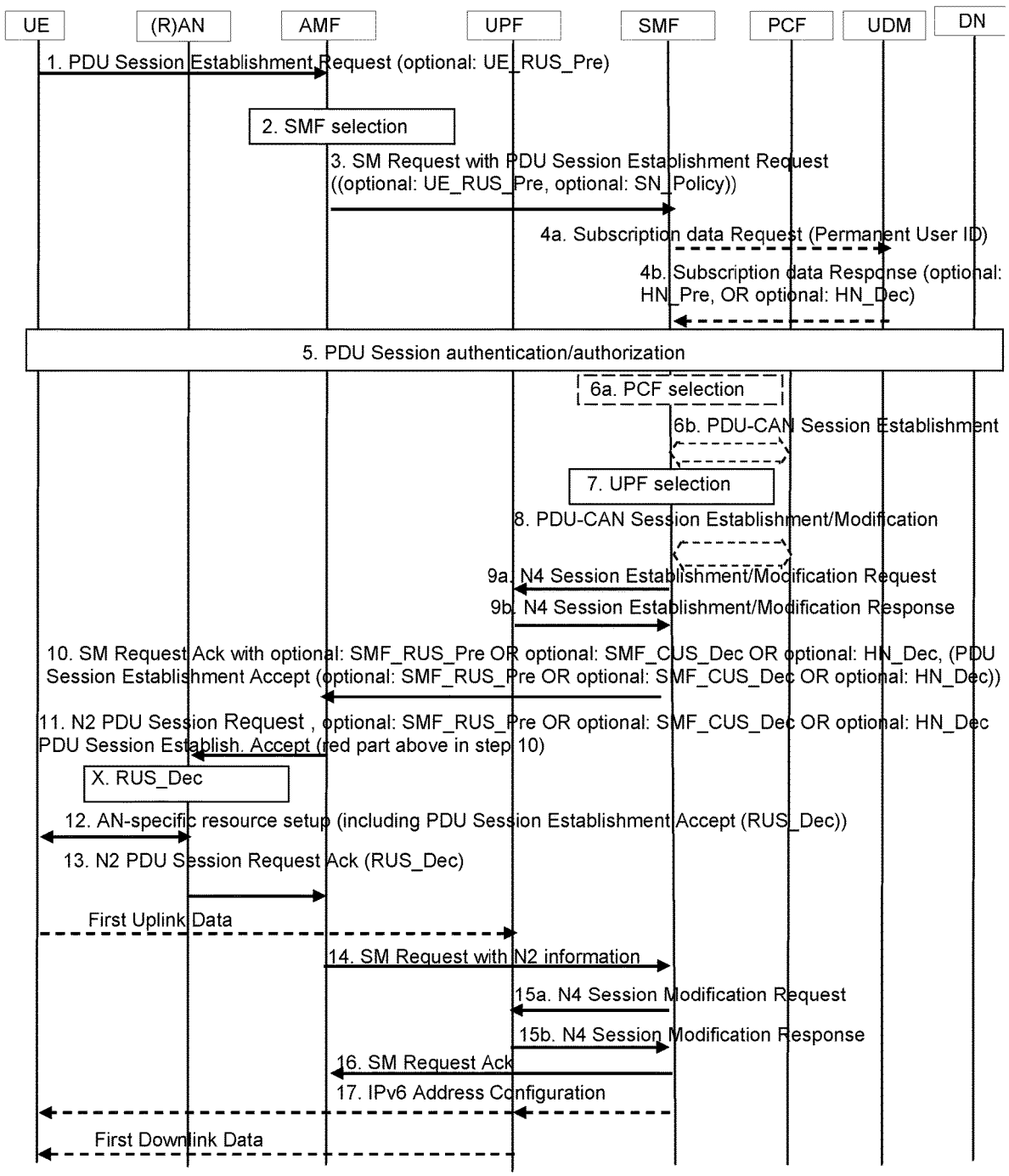
FIG. 9 is a signaling flow diagram of UE-requested PDU Session Establishment for non-roaming and roaming with local breakout.
Figure 10:
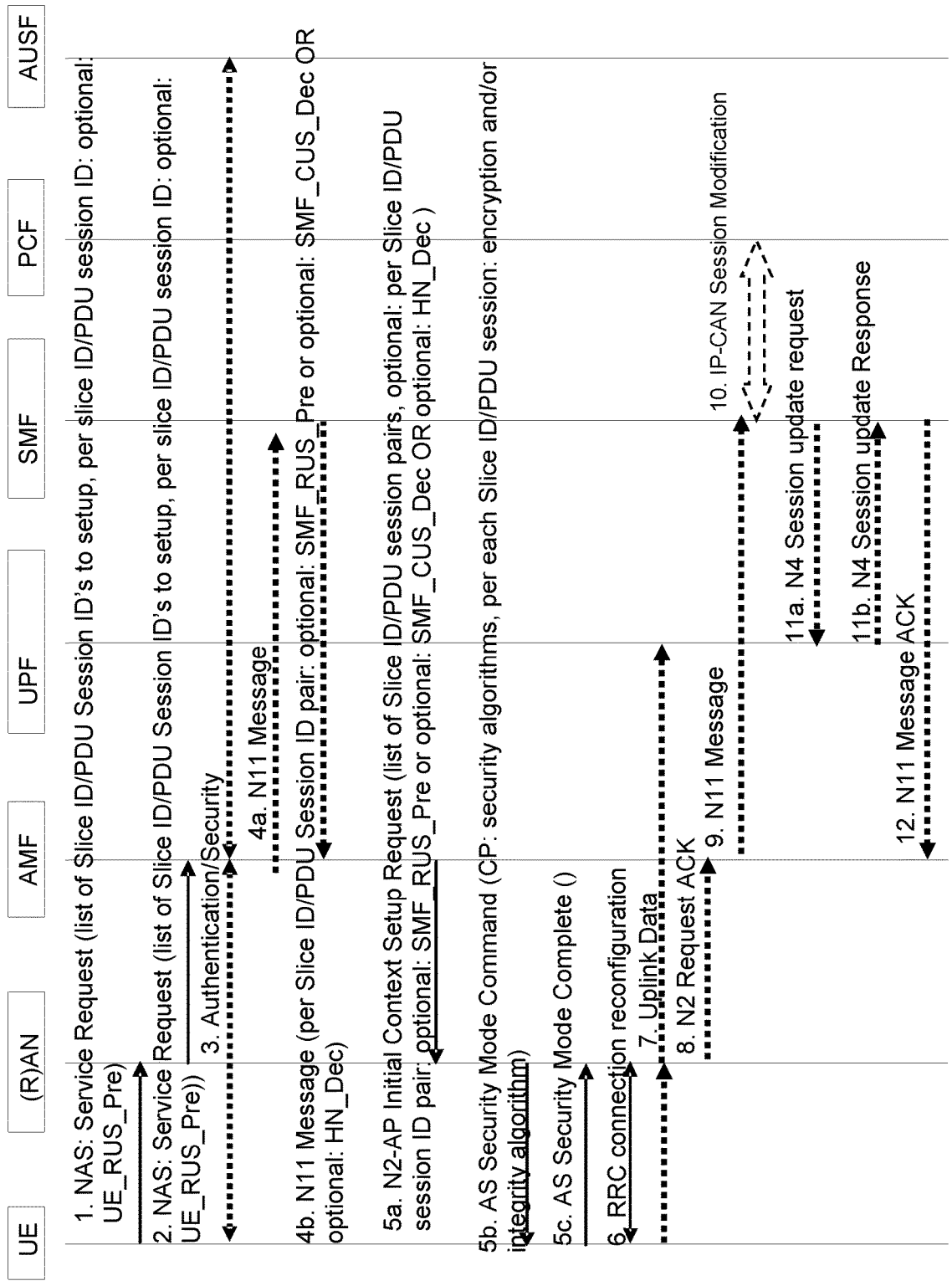
FIG. 10 is a signaling flow diagram of UE triggered Service Request in CM-IDLE state.

According to some embodiments, the SMF 48 sends a first indication to the gNB 42 (via the AMF 46) about user plane AS security activation. The gNB 42 then activates or does not activate the user plane AS security based on the received first indication from the SMF 48. FIGS. 9 and 10 further illustrate the signaling flows, the procedures, the messages, and the fields used between the SMF 48 and the gNB 42 for the said first indication (e.g., SMF_RUS_Pre). Note that FIGS. 9 and 10 only discuss the first indication; they do not discuss or account for any doNotOverrule indication, which will be discussed after FIGS. 9 and 10. Instead, FIGS. 9 and 10 actually help illustrate a problem that arises in using only the first indication (e.g., SMF_RUS_Pre).

In FIGS. 9 and 10, it is assumed that there is a protection layer supporting both integrity and encryption (or ciphering) for the User Plane (UP) between the UE and the RAN, i.e. the gNB. Whenever encryption or integrity is mentioned that is to mean respectively the encryption or the integrity protection feature in this protection layer. Currently in LTE that protection layer is realized by the PDCP protocol. It is expected that in Next Generation Systems, the same protection layer would be realized as well by possibly an enhanced version of the same protocol, i.e. PDCP.

The network controls the UP protection on the radio interface between the UE and the RAN. By control it is meant the activation or deactivation of either of integrity or encryption. The granularity of such a control could be at the level of a Network Slice or even a PDU session. That is that the network applies the controls in a similar manner to all the Radio Bearer transporting the UP on a Network Slice-specific basis or even possibly on a PDU session-specific basis.

This control feature could be realized by a negotiation mechanism between the network and the UE where UE may indicate its preference to activate or deactivate encryption or integrity on a different granularity levels. That is per Network Slice or per PDU-session.

The UE's preferences may be stored in the UDM, i.e. included in the subscription information. They can be as well preconfigured in the UE. The home network may assist in the decision making by indicating to the serving network what controls are preferable and on which granularity level.

The visited network needs to make a policy decision if encryption and/or integrity terminating shall be used or not, based on the indication received from the home network, the UE preference and the policy configured for the visited network (e.g. in the SMF). The core network could indicate to the UE in the NAS layer the outcome of such a decision.

The core network needs to inform the RAN whether encryption and/or integrity shall be used or not, per Slice ID or per PDU Session. This information is sent on N2 interface between the core network and the RAN.

The RAN could override such a decision or take its own decision based on the UE's preference received from core network and possibly other information.

If the UE's preferences are not fulfilled, then the UE may take a responsive action. The action could be to connect to another gNB/eNB, or the UE could refrain from using a certain application.

When the UE is moving in the network, and changing the point of attached to the network (i.e. at mobility, handover or dual connectivity events), the UE preference and network policy decision information need to be forwarded in the network side between the network nodes e.g. between two base-stations, or between to access management entities. Examples of such actions are: (i) In handover event, the source access management entity (AMF) informs the target AMF; (ii) In Xn-handover between two base-stations, the source base-station needs to inform the target base-station whether to enable or disable encryption and/or integrity protection of UP possibly on a lice/PDU session-specific basis. This information could be sent on the Xn interface from the source node to the target node; (iii) In dual connectivity between two base-stations, the master base-station needs to inform the secondary base-station per DRB whether to enable or disable encryption and/or integrity protection of UP. This information could be sent on the Xn interface from the master base-station to the secondary base-station.

Consider first PDU session establishment (a generalized variant). In this case, US_Pre indicates the preference of RAN UP security, UE_RUS_Pre indicates the preference of the UE on RAN UP security, SMF_RUS_Pre represents the preference of session management entity on RAN UP security, HN_Pre represents the preference of home network on UP security (this preference may indicate termination of UP security in RAN or in CN in the serving network), HN_Dec indicates the decision of home network on home terminated UP security, SN_Policy indicates the serving network policy rules related to the negotiation, and the UP security policy used as a default in RAN, RUS_Dec indicates the decision of RAN UP security made by RAN, and CUS_Dec indicates the decision of CN UP security termination.

Now with reference to FIG. 9 is shown UE-requested PDU Session Establishment for non-roaming and roaming with local breakout. The procedure assumes that the UE has already registered on the AMF thus the AMF has already retrieved the user subscription data from the UDM.

Step 1: From UE to AMF: PDU Session Establishment Request (optional: UE_RUS_Pre). The UE optionally indicates its preference of RAN user plane security. The preference may be: Optional: UE_RUS_Pre: use/use not encryption of UP data terminating in RAN; and Optional: UE_RUS_Pre: use/use not integrity protection of UP data terminating in RAN. For example, if the UE supports an IoT slice type, then the UE could indicate for that IoT slice type its preference whether to use encryption or integrity protection or both of UP data terminating in RAN or not for, this particular PDU Session ID. Or if the UE is authorized to access data network A (slice identifier), then the UE could indicate for that slice identifier its preference to use encryption or integrity protection or both for UP data terminated in RAN. Or if the UE is an IoT UE, then the UE could indicate that all UP data is preferred to use both encryption and integrity protection for UP data terminated in RAN.

Step 2: The AMF determines that the message corresponds to a request for a new PDU Session based on the PDU Session ID that is not used for any existing PDU Session(s) of the UE. The AMF selects an SMF as described in TS 23.501, clause 6.3.2.

Step 3: From AMF to SMF: SM Request with PDU Session Establishment Request (optional: UE_RUS_Pre, optional: SN_Policy). AMF forwards the UE preference to SMF. AMF may add policy information to the message: Optional: SN_policy: the AMF could indicate to SMF the policy information if SMF is allowed to request change to RAN security; and Optional: SN_policy: AMF could also indicate the default security policy values to SMF (e.g. RAN encryption is used, RAN integrity is not used).

Step 4a: SMF to UDM: Subscription Data Request (Subscriber Permanent ID, DNN). The SMF may have a common local policy which applies to all UEs accessing to the network slice related to the termination of UP security. In this case, the policy information may not be needed from UDM. If there is no common local policy, and the SMF has not yet retrieved the SM-related subscription data for the UE related with the DNN, the SMF requests this subscription data.

Step 4b: UDM to SMF: Subscription Data Response (optional: HN_Pre, OR optional: HN_Dec). The UDM may indicate to SMF the home network preference related to the RAN terminated UP security or decision on home network terminated UP security. The home network preference (HN_Pre) may be specific to RAN UP security, e.g. Optional: The UDM indicates in its subscription data whether UP encryption terminating in RAN should be used or must not be used or whether it's indifferent. Optional: The UDM indicates in its subscription data whether UP integrity protection terminating in RAN should be used or must not be used or whether it's indifferent. The home network preference (HN_Pre) may also be specific to CN termination of UP, e.g. Optional: The UDM indicates that the UP encryption and/or UP integrity should be terminated in the CN in the serving network. The home network decision (HN_Dec) is specific to home network termination of UP security, e.g. Optional: The UDM indicates that the UP encryption and/or UP integrity should be terminated in the CN in the home network.

Step 5: SMF to DN via UPF: If the SMF needs to authorize/authenticate the establishment of the PDU session as described in clause 5.6.6 of TS 23.501, the SMF selects an UPF as described in TS 23.501 clause 6.3.3 and triggers the PDU session establishment authentication/authorization. If the PDU session establishment authentication/authorization fails, the SMF terminates the PDU session establishment procedure and indicates a rejection to the UE.

Step 6a: If dynamic PCC is deployed, the SMF performs PCF selection.

Step 6b: The SMF may initiate PDU-CAN Session Establishment towards the PCF to get the default PCC Rules for the PDU Session.

Step 7: The SMF selects an SSC mode for the PDU Session.

Step 8: If dynamic PCC is deployed and the PDU-CAN Session Establishment was not done in step 5, the SMF initiate PDU-CAN Session Establishment towards the PCF to get the default PCC Rules for the PDU Session.

Step 9: If step 5 was not performed, the SMF initiates an N4 Session Establishment procedure with the selected UPF, otherwise it initiates an N4 Session Modification procedure with the selected UPF.

Step 9a: The SMF sends an N4 Session Establishment/Modification Request to the UPF and provides Packet detection, enforcement and reporting rules to be installed on the UPF for this PDU Session.

Step 9b: The UPF acknowledges by sending an N4 Session Establishment/Modification Response.

Step 10: SMF to AMF: SM Request Ack with optional: SMF_RUS_Pre OR optional: SMF_CUS_Dec OR optional: HN_Dec, (PDU Session Establishment Accept (optional: SMF_RUS_Pre OR optional: SMF_CUS_Dec OR optional: HN_Dec)). This message may include the SMF request of RAN UP security (SMF_RUS_Pre), or SMF decision of CN terminated security of UP in the serving network (SMF_CUS_Dec), or HN decision of CN terminated security of UP in the home network (HN_Dec).

Step 11: AMF to (R)AN: N2 PDU Session Request, optional: SMF_RUS_Pre OR optional: SMF_CUS_Dec OR optional: HN_Dec, (PDU Session Establish. Accept (optional: SMF_RUS_Pre OR optional: SMF_CUS_Dec OR optional: HN_Dec)). The information from message 10 is forwarded to RAN.

Step X: This is a step between steps 11. and 12. (R)AN makes the policy decision related to security for UP terminated in RAN. The RAN considers all information provided to it: The local policy of RAN related to security of UP terminated in RAN; UE_RUS_Pre; SMF_RUS_Pre; SMF_CUS_Dec; and HN_Dec.

Step 12: (R)AN to UE: AN-specific resource setup (including PDU Session Establishment Accept (RUS_Dec)). The (R)AN indicates the policy decision to UE. If (R)AN actives encryption and/or integrity protection for this PDU Session ID/Slice ID between UE and (R)AN, then the (R)AN shall indicate the selected algorithms for integrity protection and/or encryption of UP data sent on all the radio bearers serving this PDU Session ID in the RRC Connection Reconfiguration message to the UE. The RRC Connection Reconfiguration message is integrity protected. Optional:

The UE stores the preference or indication regarding whether UP encryption terminating shall be used in RAN or not, received in PDU Session Establishment Accept message for this PDU Session ID/Slice ID. Optional. The UE stores the preference or indication regarding whether UP integrity protection terminating shall be used in RAN or not, received in PDU Session Establishment Accept message for this PDU Session ID/Slice ID. Optional. The UE may activate encryption and/or integrity protection for this PDU Session ID between UE and (R)AN if the preference or indications received in PDU Session Establishment Accept message indicates so. Optional. The UE is taking the selected algorithms for integrity protection and/or encryption received in the RRC Connection Reconfiguration message from the (R)AN into use. The (R)AN may have a different preference and not follow the preference sent in PDU Session Establishment Accept message to the UE. Optional. The UE can now send encrypted and/or integrity protected UP data for this PDU Session ID/Slice ID.

Step 13: (R)AN to AMF: N2 PDU Session Request Ack (RUS_Dec). RAN indicates the policy decision to AMF. The (R)AN indicates to AMF and SMF whether UP encryption termination in RAN is taken into use for this PDU Session ID. The (R)AN indicates to AMF and SMF whether UP integrity protection termination in RAN is taken into use for this PDU Session ID.

Step 14: AMF to SMF: SM Request (N2 SM information). The AMF forwards the N2 SM information received from (R)AN to the SMF. Optional; AMF may indicate the policy decision to AMF.

Step 15a: If the N4 session for this PDU Session was not established already, the SMF initiates an N4 Session Establishment procedure with the UPF.

Step 15b: The UPF provides a N4 Session Establishment/Modification Response to the SMF.

Step 16: After this step, the AMF forwards relevant events to the SMF, e.g. at handover where the (R)AN Tunnel Info changes or the AMF is relocated.

Step 17: SMF to UE, via UPF: In case of PDU Type IPv6, the SMF generates an IPv6 Router Advertisement and sends it to the UE via N4 and the UPF.

Consider now FIG. 10 which shows UE triggered Service Request in CM-IDLE state. There are two different options (Option 1 and Option 2) described where the RAN indicate to UE how to establish and setup UP security for radio bearers serving the same PDU Session ID.

Step 1. UE to (R)AN: MM NAS Service Request (PDU session ID(s), security parameters, PDU session status, per slice ID/PDU session ID: optional: UE_Rus_Pre). Optional: per PDU Session ID: The UE indicates its UE_Rus_Pre.

Step 2. (R)AN to AMF: N2 Message(MM NAS Service Request (PDU session ID(s), security parameters, PDU session status, per slice ID/PDU session ID: optional: UE_Rus_Pre), 5G Temporary ID, Location information, RAT type, RRC establishment cause).

Step 3. If the Service Request was not sent integrity protected or integrity protection is indicated as failed, the AMF shall initiate NAS authentication/security procedure as defined in clause 4.6 of TS 23.502.

Step 4a. [Conditional] AMF to SMF: N11 Message (PDU session ID(s)). If the MM NAS Service Request message includes PDU session ID(s), or this procedure is triggered by SMF but PDU session IDs from UE correlates to other SMFs than the one triggering the procedure, the AMF sends N11 message to SMF(s) associated with the PDU session ID(s).

Step 4b. [Conditional] SMF to AMF: N11 Message (per Slice ID/PDU Session ID pair: optional: SMF_RUS_Pre or optional: SMF_CUS_Dec OR optional: HN_Dec, (N2 SM information (QoS profile, CN N3 Tunnel Info, per Slice ID/PDU Session ID pair: optional: SMF_RUS_Pre or optional: SMF_CUS_Dec OR optional: HN_Dec)) to the AMF. After receive the N11 Message in 4a, each SMF sends N11 Message to the AMF to establish the user plane(s) for the PDU sessions. The N2 SM information contains information that the AMF shall provide to the RAN. Optional: The SMF includes the following information per Slice ID/PDU Session ID pair: optional: SMF_RUS_Pre or optional: SMF_CUS_Dec OR optional: HN_Dec.

Step 5a. AMF to (R)AN: N2 Request (N2 SM information received from SMF, security context, AMF Signalling Connection ID, Handover Restriction List, MM NAS Service Accept, list of Slice ID/PDU session ID pairs: per Slice ID/PDU Session ID pair: optional: SMF_RUS_Pre or optional: SMF_CUS_Dec OR optional: HN_Dec). The AMF includes the following information to RAN: list of Slice ID/PDU session ID pairs, per each Slice ID/PDU session ID pairs: optional: SMF_RUS_Pre or optional: SMF_CUS_Dec OR optional: HN_Dec.

Step 5b. RAN to UE: AS Security Mode Command (selected encryption and integrity algorithm for protection of CP signalling, Option 1: per Slice ID/PDU Session ID: selected encryption algorithms and/or integrity algorithm for protection of UP data). This message is integrity protected with K-RRCint key.

For both Option 1 and Option 2, for all radio bearers serving the same Slice ID/PDU Session ID, The (R)AN stores the received: optional: SMF_RUS_Pre OR optional: SMF_CUS_Dec OR optional: HN_Dec for this Slice ID/PDU Session ID, received in N2 SM information. The RAN may have a different policy configured which may override the preference received from core network. The RAN decides and sets the policy of RAN UP security in RUS_Dec. If RUS_Dec indicates that UP encryption termination shall be used in RAN then RAN may activate encryption for all the radio bearers serving this Slice ID/PDU Session ID between UE and (R)AN. The (R)AN selects algorithm for encryption by selecting a common algorithm from the UE 5G capability (with algorithms supported by UE) received from AMF and the algorithms configured with the highest priority in the configured list in (R)AN. If RUS_Dec indicates that UP integrity protection termination shall be used in RAN then RAN may activate integrity protection for the all radio bearers serving this Slice ID/PDU Session ID between UE and (R)AN. The (R)AN selects algorithm for integrity protection by selecting a common algorithm from the UE 5G capability (with algorithms supported by UE) received from AMF and the algorithms configured with the highest priority in the configured list in (R)AN. If RUS_Dec indicates that UP encryption terminating shall not be used in RAN then RAN may not activate encryption for the radio bearers serving this Slice ID/PDU Session ID between UE and (R)AN. RAN indicates to UE that UP encryption shall not be used for all the radio bearers serving this Slice ID/PDU Session ID between UE and (R)AN. If RUS_Dec indicates that UP integrity protection terminating shall not be used in RAN then RAN may not activate integrity protection for the radio bearers serving this Slice ID/PDU Session ID between UE and (R)AN. RAN indicates to UE that UP integrity protection shall not be used for all the radio bearers serving this Slice ID/PDU Session ID between UE and (R)AN.

Step 5c. UE to RAN: AS Security Mode Command Complete ( ). UE takes the indicated security algorithms for protection of CP signalling into use. The UE takes the indicated security algorithms for all radio bearers serving the same Slice ID/PDU Session for protection of UP data into use.

Step 6. (R)AN to UE: RRC Connection Reconfiguration (Option 2: for radio bearers serving the same Slice ID/PDU Session ID: selected encryption algorithms and/or integrity algorithm for protection of UP data). The RAN performs RRC Connection Reconfiguration with the UE depending on the QoS Information for all the QoS Flows of the PDU Sessions activated and Data Radio Bearers. The user plane security is established at this step, which is described in detail in RAN specifications. Option 2: See text above in step 5b. The RAN forwards the MM NAS Service Accept to the UE. The UE locally deletes context of PDU sessions that are not available in 5G CN.

Step 7. After the user plane radio resources are setup, the uplink data from the UE can now be forwarded to RAN. The 5G RAN sends the uplink data to the UPF address and Tunnel ID provided in the step 4.

There is a further challenge in the activation of the user plane AS security, as mentioned above, which is discussed next. It is possible that the gNB is not able to comply with the said first indication (e.g., SMF_RUS_Pre) from the SMF. In other words, the gNB may not be able to activate user plane AS security even though the said first indication from the SMF meant that the user plane AS security needs to be activated. There could be various reasons for the gNB in not being able to comply with the said first indication from the SMF, e.g., the gNB is overloaded because of serving large number of UEs at the same time and therefore the gNB is configured to not use any cryptographic operations for the sake of computational efficiency, or the gNB is in power saving mode and therefore the gNB is configured to not use any cryptographic operations for the sake of battery efficiency, etc. In some scenarios, a model is assumed when the RAN and the core network are owned and operated by different parties. In such scenarios, several core networks could share a single RAN. This could mean that a RAN-party selling the 5G RAN services has agreed different policies with each of the core-network-parties operating the 5G core networks, and some core-network-parties may not be authorized to activate user plane AS security. The core-network-party that is willing to pay for, e.g. user plane integrity, could be the only one which is allowed to activate user plane integrity. In such cases, the gNB proceeds further without activating the user plane AS security, even though indicated by the SMF to be activated. However, the SMF should at least be aware that the first indication was not complied with by the gNB. According to some embodiments, then, the gNB 42 sends a second indication to the SMF 48 (via the AMF 46) for informing the SMF 48 whether the gNB activated or did not activate the user plane AS security. FIGS. 9 and 10 discuss the signaling flows, the procedures, the messages, and the fields used between the SMF 48 and the gNB 42 for the said second indication.

The first and the said second indications may not be sufficient for the security of the user plane traffic. Some embodiments therefore propose a new mechanism that provides a robust mechanism for user plane AS security activation.

In this regard, mind that the SMF 48 prepared the first indication based on some policy, e.g. an important user plane traffic belonging to the President of a nation needs to be both confidentiality and integrity protected, or a short data burst belonging to an IoT (Internet of Things) device needs to be integrity protected, or a multimedia traffic belonging to a video service needs to be confidentiality protected, etc. Depending upon the policy or use case, it may be unacceptable that the gNB 42 does not comply with the said first indication sent by the SMF 48, e.g., even if the gNB 42 is overloaded or operating in power saving mode, it may be a serious problem if the user plane traffic belonging to the President of a nation is not confidentiality and integrity protected by the gNB 42. Mind that it is not sufficient for the gNB 42 to send the said second indication to the SMF 48. The SMF 48 knows about the user plane AS security activation status, but it may be too late before the SMF 48 takes further action, e.g. some uplink data already sent by the UE 40 over-the-air, or some downlink data already send by the gNB 42 over-the-air. The SMF 48 knows but the damage has been done.

The main cause of the above-mentioned problem is that it is the SMF 48 who has right information about sensitivity of the user plane traffic and corresponding policy while it is the gNB 42 who overrules the said first indication sent by the SMF 48. With that observation, some embodiments propose that the SMF 48 (in a general term, some core network node 16 in FIG. 1) indicates to the gNB 42 (in a general term, some RAN node 12 in FIG. 1) whether the gNB 42 can overrule or not the SMF's decision on user plane AS security activation. In other words, the gNB 42 does not overrule the SMF's decision unless permitted to do so by the SMF 48. The new effect of doing so is that it is always the SMF 48 which takes the final decision on user plane AS security activation and a situation where the user plane AS security is not activated by the gNB 42, despite of the SMF's decision to activate it, is avoided.

Figure 11:
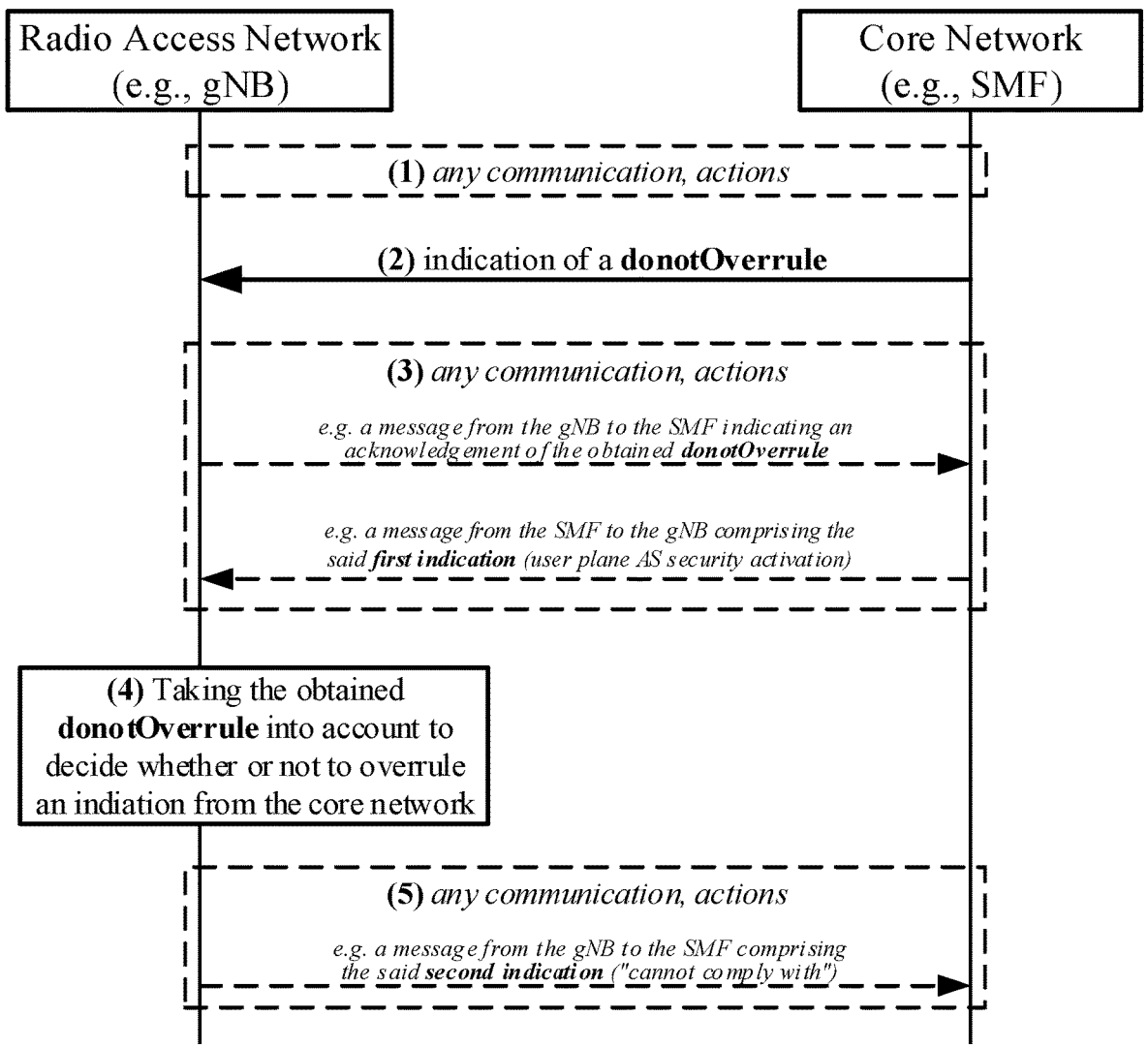
FIG. 11 is a signaling flow diagram of some embodiments for CN control over RAN override of the CN decision of UP AS security.

FIG. 11 illustrates the general concept of some embodiments.

Step 1: Any prior communication or actions between or in the gNB 42 and the SMF 48.

Step 2: The SMF 48 indicates to the gNB 42 an allowed behavior, denoted donotOverrule. The said donotOverrule indicates to the gNB 42 whether the gNB 42 is allowed or not to overrule any user plane AS security activation indications from the SMF 48.

Step 3: Any communication or actions between the gNB 42 and the SMF 48. One example may be a message from the gNB 42 to the SMF 48 indicating an acknowledgement that is has received and accepts the donotOverrule indication, or an error message that the gNB 42 is not able to accept the donotOverrule indication. Another example may be a message from the SMF to the gNB f42 or user plane session establishment and an indication (denoted the first indication earlier) of user plane AS security activation.

Step 4: The gNB 42 takes into account the obtained donotOverrule to decide whether or not to overrule an indication from the SMF. For example—Due to an overload or power-saving mode, the gNB 42 may determine that it cannot comply with the first indication from the SMF 48 which indicates the gNB 42 to activate user plane AS security. However, the said donotOverrule does not allow the gNB 42 to overrule the first indication. Therefore, the gNB 42 does not overrule the first indication from the SMF 48. In other words, the gNB 42 does not proceed with the user plane session establishment without user plane AS security.

Step 5: Any communication or actions between the gNB 42 and the SMF 48. One example may be a message from the gNB 42 to the SMF 48 with an indication (denoted the second indication earlier) of whether the gNB 42 was capable or not to comply with the first indication.

The gNB 42 may only send the second indication when the gNB 42 cannot comply with the first indication. In other words, when the gNB 42 can comply with the first indication, then the gNB 42 proceeds with user plane session establishment and does not send the second indication to the SMF 48, then the SMF 48 implicitly knows that the first indication was complied with. Further, the second indication from the gNB 42 to the SMF 48 may include information on why the gNB 42 was not able to comply with the first indication, e.g., "cannot comply with due to overloaded", "cannot comply with due to power-saving mode", "cannot comply with because the SMF 48 is not authorized to activate user plane AS security", etc.

The said donotOverrule indication may be transferred directly between the gNB 42 and the SMF 48 or there might be intermediate nodes which eventually forward the said donotOverrule indication to the gNB 42. e.g, via intermediate AMF 46 or other intermediate gNBs, meaning that an intermediate node may forward the received donotOverrule.

The said donotOverrule indication may be implemented in various ways, for example, but not limiting to the following. An explicit way of implementation could be e.g., a boolean field where TRUE denotes that the gNB 42 is not allowed to overrule and FALSE denotes that the gNB 42 is not allowed to overrule, or a string field where "allowed" denotes that the gNB 42 is allowed to overrule and "not_allowed" denotes that the gNB 42 is not allowed to overrule. The donotOverrule may also have more granular policy indicating which conditions the gNB 42 is allowed to overrule in and which conditions the gNB 42 is not allowed to overrule in without SMF's further confirmation. Example of granular policy could be, e.g., "overrule allowed for confidentiality", "overrule not_allowed for integrity protection", "overrule allowed during Sundays", "overrule allowed when number of connected UEs are more than 10000", etc. An implicit way of implementation could be e.g., absence of a field means that the gNB 42 is allowed to overrule and presence of a field denotes that the gNB 42 is not allowed to overrule, or vice-versa.

The said donotOverrule indication may vary in various ways, for example, but not limiting to: (i) Relative to service type: e.g., the donotOverrule is FALSE for video service, and TRUE for IoT service; (ii) Relative to location of gNB: e.g., the donotOverrule is FALSE for gNBs inside a physically secluded premise, and TRUE for gNBs which are open in public areas; (iii) Relative to subscriber type: e.g., the donotOverrule is FALSE for public subscribers, and TRUE for the President of a nation; and/or (iv) Relative to time: e.g., the donotOverrule is FALSE during Olympic games, and TRUE during national election. The gNB 42 may obtain the said donotOverrule indication in various ways, for example, but not limiting to the following. In a first way, the donotOverrule indication may be obtained n a same message that comprises an indication from the SMF about the user plane AS security activation (denoted the first indication earlier). In other words, the said donotOverrule and the said first indication are sent in a same message. Doing so could mean that the donotOverrule applies only to the first indication along with which the donotOverrule is obtained.

In a second way, the donotOverrule indication may be obtained during a UE specific user plane session establishment between the gNB and the core network, e.g., donotOverrule is multiplexed with or added to a PDU session establishment accept message from the SMF 48 to the gNB 42 which is forwarded to the gNB 42 via the AMF 46 in a N2-PDU Session Request message.

In a third way, the donotOverrule indication is not sent as part of the signaling for user plane session establishment between the gNB and the SMF 48, rather the gNB 42 obtains the donotOverrule from a configuration, e.g., read from a network database, fetched from a local file, fetched from a network node, etc. The donotOverrule may indicate if an overrule is allowed or not allowed for all UEs sending user plane session establishment requests to a particular SMF or a network slice.

In a fourth way, the donotOverrule indication is obtained during an interface setups between the gNB 42 and the core network, e.g., N2/N11 (gNB-AMF-SMF) or N3/N4 (gNB-UPF-SMF).

In a fifth way, the donotOverrule indication is obtained during UE specific initial context setup between the gNB 42 and the core network.

In a sixth way, the donotOverrule indication is obtained during UE specific handover preparation phase between the gNB 42 and the core network.

In a seventh way, the donotOverrule indication is obtained during UE specific handover preparation phase between the gNBs.

There may be various actions of the gNB 42 and the SMF 48, when the first indication cannot be complied with by the gNB 42, for example, but not limiting to the following. Some possible actions could be to cancel, reject, or drop any ongoing user plane session or in-progress user plane session establishment. The SMF 48 may also decide to temporarily change user plane security policy, e.g. to not activate user plane AS security for current session and indicate the same to the gNB. The SMF 48 may want to do so in cases when damage due to potential no communication is higher than damage due to less secure communication. The SMF may indicate such to the gNB 42, e.g., by indicating that user plane AS security is not to be activated (e.g., the first indication is FALSE), or by indicating that user plane AS security is to be activated but the gNB 42 can overrule the SMF's indication (e.g., the first indication is TRUE and the donotOverrule is FALSE). The SMF 48 or the gNB 42 may also indicate to the UE to select different gNB which may have a better chance of complying with the first indication, e.g., because of not being overloaded or not working in power saving mode. In the case of a virtualized RAN, it may be possible for the SMF 48 to increase the resources available to the gNB 42 on-the-fly and then retry user plane session establishment.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, radio network nodes such as access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

Figure 12:
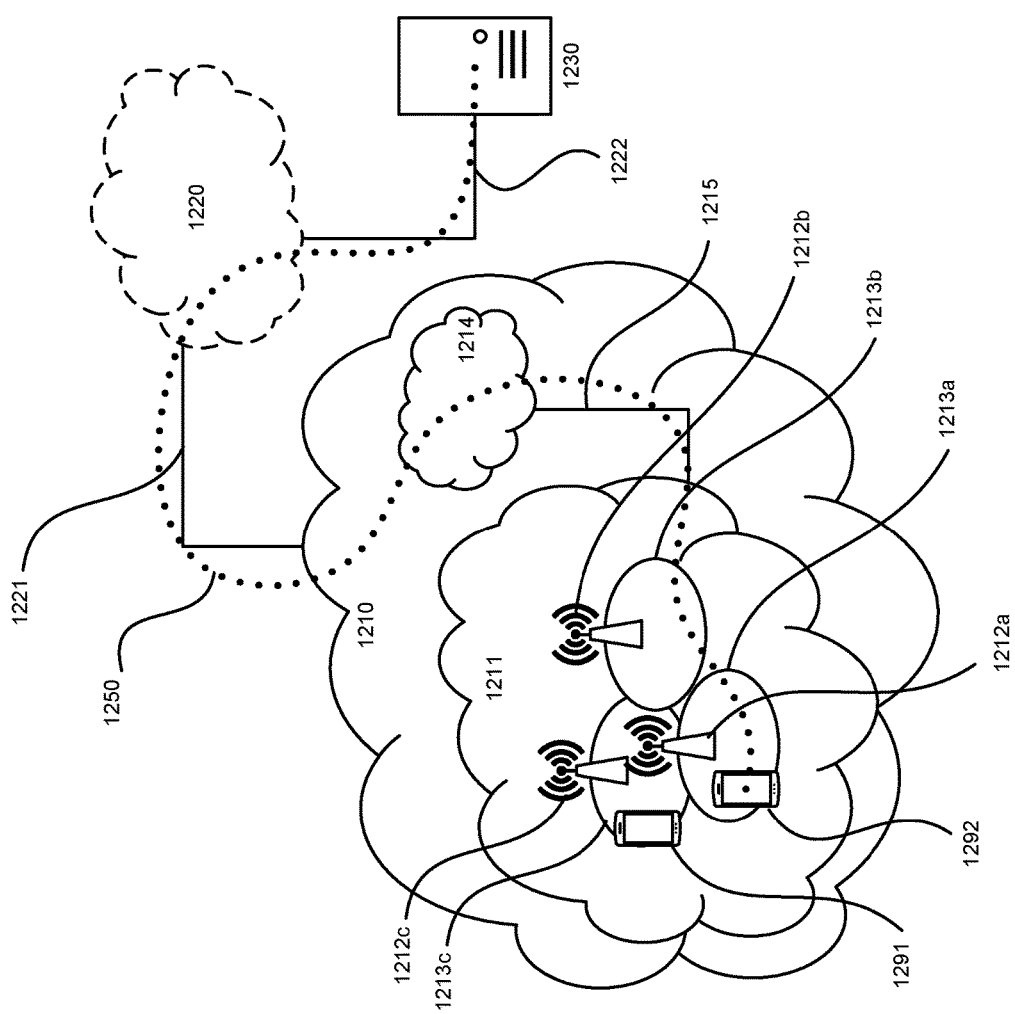
FIG. 12 is a block diagram of a communication network with a host computer according to some embodiments.

FIG. 12 illustrates a telecommunication network connected via an intermediate network to a host computer in accordance with some embodiments. In particular, with reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
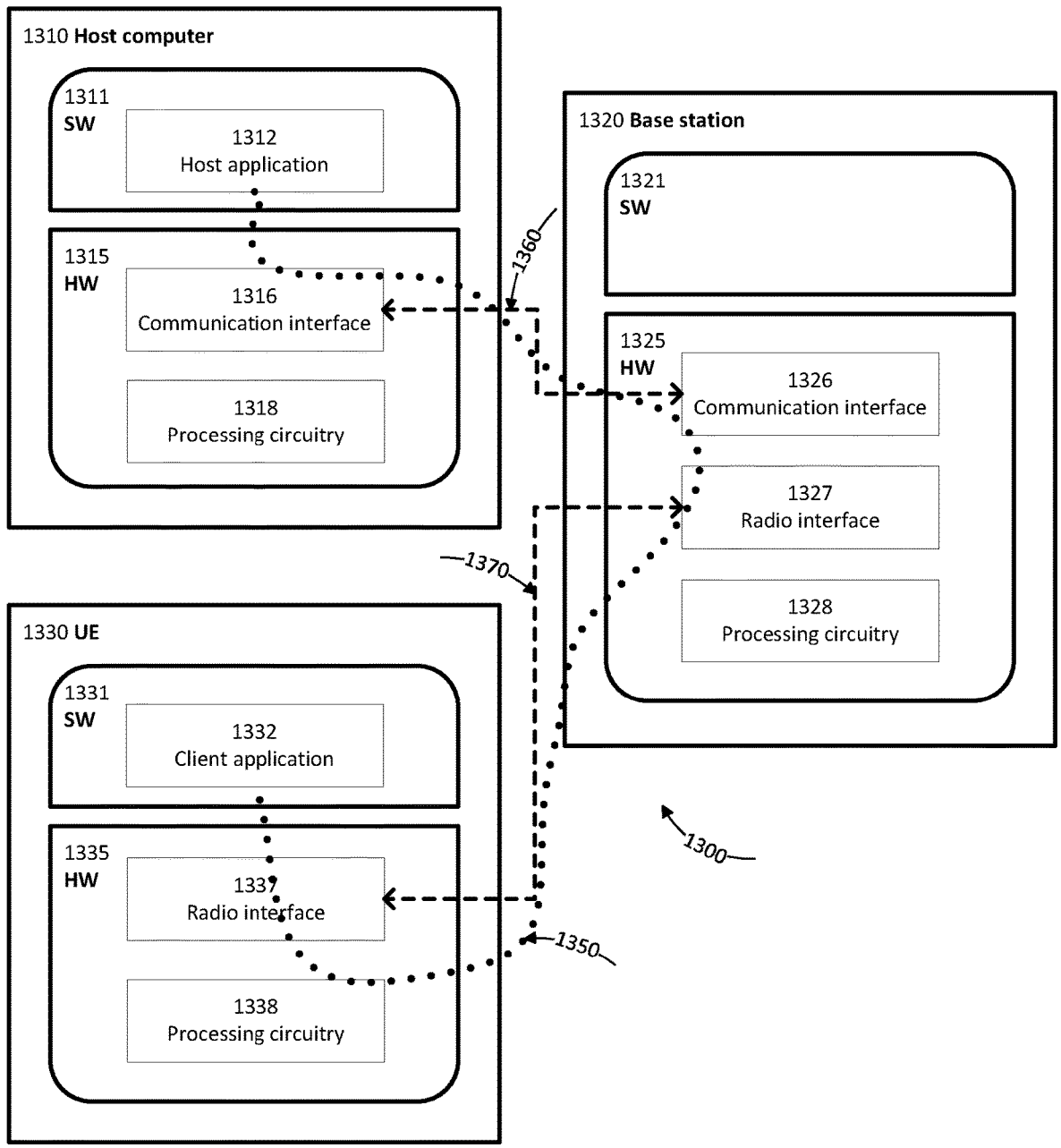
FIG. 13 is a block diagram of a host computer according to some embodiments.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve load balancing, radio rsource efficiency, and power efficiency in the network and thereby provide benefits such as reduced user waiting time, relaxed restriction on file size, and better responsiveness.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
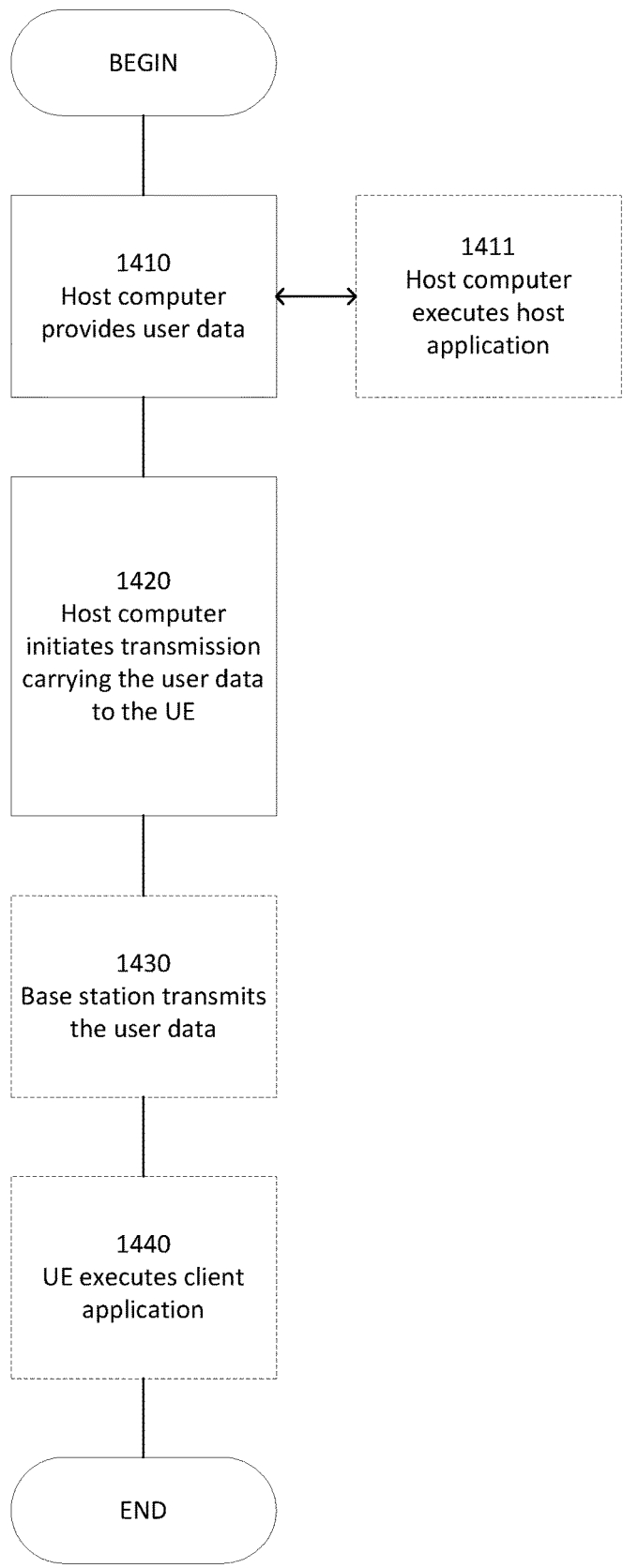
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
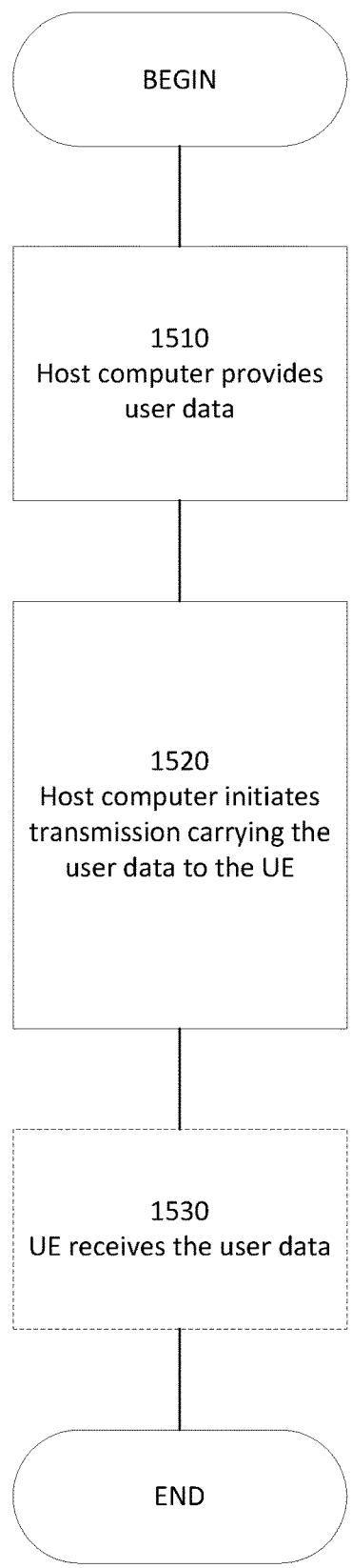
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
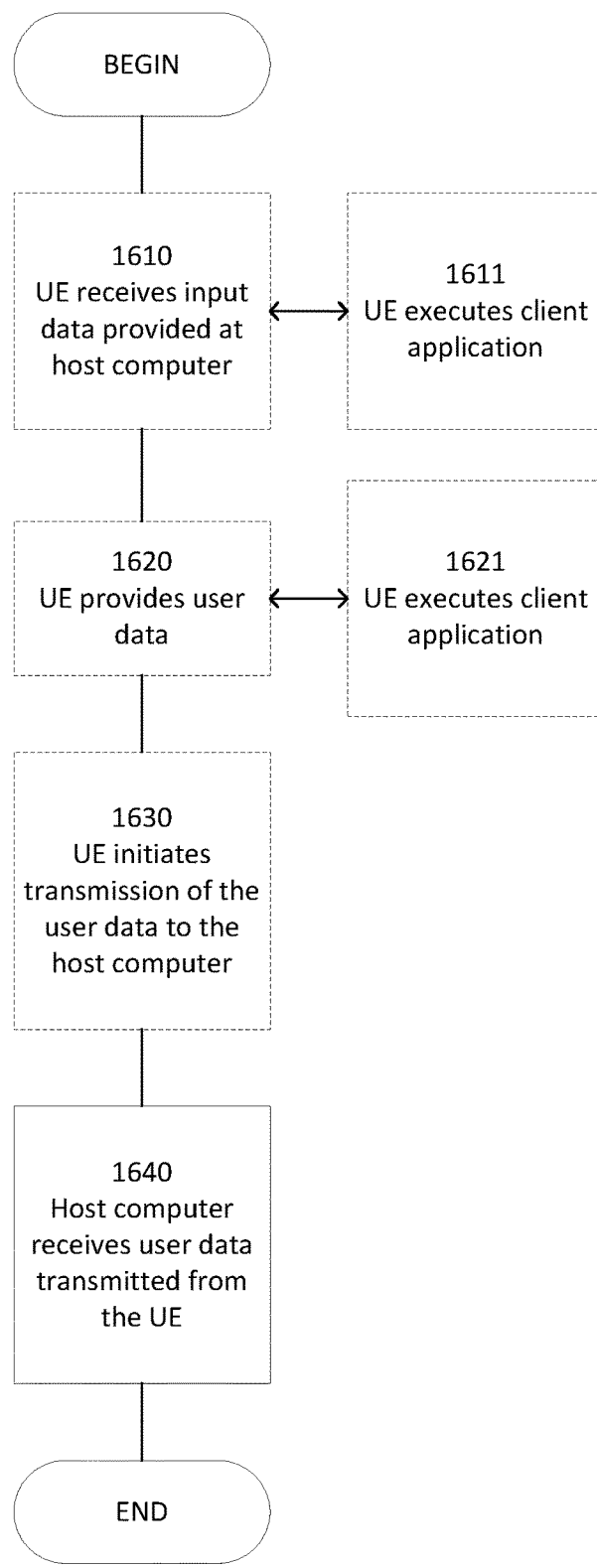
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
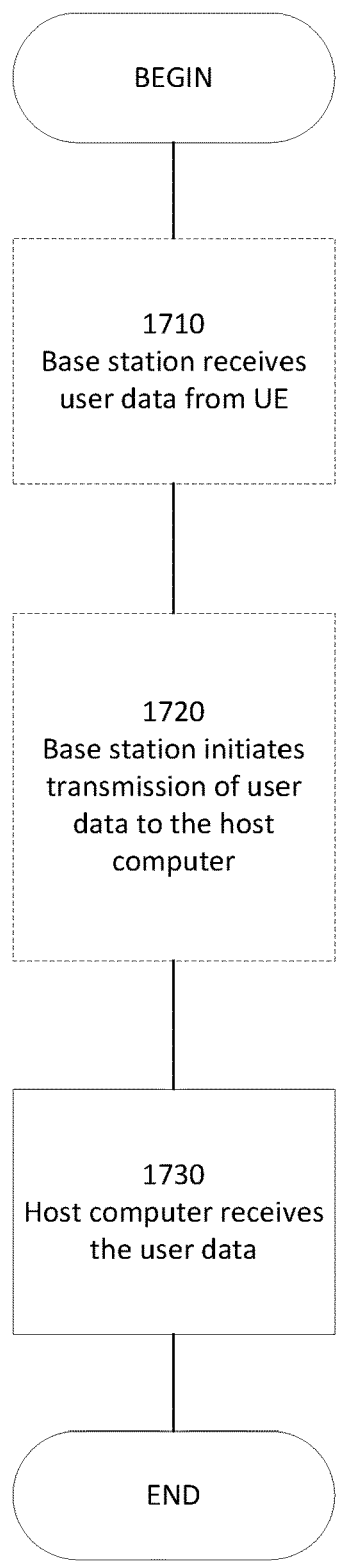
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, some embodiments herein include those enumerated below.

Embodiment 1

A method for configuring user plane access stratum (AS) security in a wireless communication system that includes a radio access network (RAN) and a core network (CN), the method performed by a RAN node in the RAN and comprising: obtaining an activation indication that indicates a decision by the CN of whether or not the RAN node is to activate user plane AS security; and obtaining an overrule allowance indication that indicates whether or not the RAN node is allowed to overrule the decision by the CN.

Embodiment 2

The method of embodiment 1, further comprising activating or not activating user plane AS security, depending on the activation indication and the overrule allowance indication.

Embodiment 3

The method of embodiment 2, comprising activating or not activating user plane AS security, further depending on information indicating an ability or desirability of the RAN node to activate user plane AS security.

Embodiment 4

The method of any of embodiments 1-3, further comprising determining whether or not activate user plane AS security, based on one or more of: a loading level of the RAN node; power efficiency or availability at the RAN node; and authorization of the CN to activate user plane AS security; and a mode of the RAN node.

Embodiment 5

The method of any of embodiments 1-4, wherein obtaining the overrule allowance indication comprises receiving the overrule allowance indication in a message from the CN.

Embodiment 6

The method of any of embodiments 1-4, wherein obtaining the overrule allowance indication comprises fetching the overrule allowance indication from a database in the RAN or the CN, or reading the overrule allowance indication from a file local to the RAN node.

Embodiment 7

A method for configuring user plane access stratum (AS) security in a wireless communication system that includes a radio access network (RAN) and a core network (CN), the method performed by a CN node in the CN and comprising: signaling an activation indication that indicates a decision by the CN of whether or not a RAN node in the RAN is to activate user plane AS security; and signaling an overrule allowance indication that indicates whether or not the RAN node is allowed to overrule the decision by the CN.

Embodiment 8

The method of embodiment 7, comprising signaling the overrule allowance indication by transmitting from the CN node a message that includes the overrule allowance indication.

Embodiment 9

The method of embodiment 7, comprising signaling the overrule allowance indication by writing the overrule allowance indication in a database in the RAN or the CN, or in a file local to the RAN node.

Embodiment 10

The method of any of embodiments 1-9, wherein the overrule allowance indication is set based on and/or applies specifically for one or more of: a particular type of user plane AS security; a particular type or priority of service for which user plane traffic is to be communicated over user plane AS; a particular RAN node location or location type; a particular RAN node loading level; a particular type or priority of subscriber whose user plane traffic is to be communication over user plane AS; and a particular time or event.

Embodiment 11

The method of any of embodiments 1-10, wherein the overrule allowance indication applies specifically for a particular user plane session or a particular category of user plane sessions.

Embodiment 12

The method of any of embodiments 1-10, wherein the overrule allowance indication applies for any user plane session managed by a particular CN node and/or associated with a particular network slice.

Embodiment 13

The method of any of embodiments 1-12, further comprising performing one or more actions when: the decision by the CN is that the RAN node is to activate user plane AS security; and according to the overrule allowance indication, the RAN node is not allowed to overrule the decision by the CN; and the RAN node is not able, or the CN is not authorized, to activate user plane AS security.

Embodiment 14

The method of embodiment 13, wherein the one or more actions include canceling, rejecting, or dropping a user plane session or user plane session establishment.

Embodiment 15

The method of any of embodiments 13-14, wherein the RAN node has established or is establishing a user plane session with a wireless communication device, and wherein the one or more actions include steering the wireless communication device to a different RAN node.

Embodiment 16

The method of any of embodiments 13-15, wherein the one or more actions include increasing resources available at the RAN node for user plane AS security.

Embodiment 17

The method of any of embodiments 13-16, wherein the one or more actions include the CN modifying the decision and/or the overrule allowance indication to allow a user plane session to be established without user plane AS security (rather than the user plane session being canceled, rejected, or dropped).

Embodiment 18

The method of any of embodiments 1-5, 7-9, and 10-17, wherein the activation indication and the overrule allowance indication are included in the same message signaled from the CN to the RAN node.

Embodiment 19

The method of any of embodiments 1-18, wherein the overrule allowance indication is specific to the activation indication so as to indicate whether or not the RAN node is allowed to overrule the decision indicated specifically by the activation indication.

Embodiment 20

The method of any of embodiments 1-19, wherein the overrule allowance indication is signaled from the CN to the RAN node during a procedure for establishing a user plane session for a particular wireless communication device.

Embodiment 21

The method of any of embodiments 1-5, 7-9, and 10-20, wherein the overrule allowance indication is a boolean field in a message signaled from the CN to the RAN node, wherein a first value of the boolean field indicates the RAN node is not allowed to overrule the decision and a second value of the boolean field indicates the RAN node is allowed to overrule the decision.

Embodiment 21A

The method of any of embodiments 1-21, wherein the overrule allowance indication indicates whether or not the CN allows the RAN node to overrule the decision by the CN.

Embodiment 22

A method performed by a wireless communication device configured for use in a wireless communication system that includes a radio access network (RAN) and a core network (CN), the method comprising: responsive to a RAN node in the RAN not being able to activate user plane access stratum (AS) security according to a decision by the CN that the RAN node is not allowed to overrule, receiving signaling steering the wireless communication device to establish a user plane session with a different RAN node.

Embodiment 23

The method of embodiment 22, further comprising attempting to establish a user plane session with the different RAN node in accordance with the received signaling.

Embodiment 24

The method of any of embodiments 1-23, wherein the decision by the CN is a decision of whether or not the RAN node is to activate user plane AS security with a non-null algorithm.

Embodiment 25

The method of any of embodiments 1-24, wherein the decision by the CN is a decision of whether or not the RAN node is to activate user plane AS security in the form of user plane integrity protection and/or user plane confidentiality protection.

Embodiment 26

The method of any of embodiments 1-25, wherein the decision is made by the CN based on network policy rules and/or subscription policy rules.

Embodiment 27

The method of any of embodiments 1-26, wherein the decision is made by a CN node that performs user plane session management.

Embodiment 28

The method of any of embodiments 1-27, wherein the decision is made by a session management function, SMF, in the CN.

Embodiment 29

The method of any of embodiments 1-28, wherein the decision is made by the CN on a network slice specific basis.

Embodiment 30

The method of any of embodiments 1-28, wherein the decision is made by the CN on a user plane session specific basis.

Embodiment 31

The method of any of embodiments 1-30, wherein the decision corresponds to SMF_RUS_Pre.

Embodiment 32

The method of any of embodiments 1-31, wherein the decision is signaled from the CN to the RAN node in a packet data unit (PDU) session establishment procedure or message.

Embodiment 33

A radio access network (RAN) node for configuring user plane access stratum (AS) security in a wireless communication system that includes a RAN and a core network (CN), the RAN node configured to: obtain an activation indication that indicates a decision by the CN of whether or not the RAN node is to activate user plane AS security; and obtain an overrule allowance indication that indicates whether or not the RAN node is allowed to overrule the decision by the CN.

Embodiment 33

A radio access network (RAN) node for configuring user plane access stratum (AS) security in a wireless communication system that includes a RAN and a core network (CN), the RAN node configured to: obtain an activation indication that indicates a decision by the CN of whether or not the RAN node is to activate user plane AS security; and obtain an overrule allowance indication that indicates whether or not the RAN node is allowed to overrule the decision by the CN.

Embodiment 34

The RAN node of embodiment 33, configured to perform the method of any of embodiments 2-6, 10-21, and 24-31.

Embodiment 35

A radio access network (RAN) node for configuring user plane access stratum (AS) security in a wireless communication system that includes a RAN and a core network (CN), the RAN node comprising: processing circuitry and a memory, the memory containing instructions executable by the processing circuitry wherein the RAN node is configured to: obtain an activation indication that indicates a decision by the CN of whether or not the RAN node is to activate user plane AS security; and obtain an overrule allowance indication that indicates whether or not the RAN node is allowed to overrule the decision by the CN.

Embodiment 36

The RAN node of embodiment 35, the memory containing instructions executable by the processing circuitry wherein the RAN node is configured to perform the method of any of embodiments 2-6, 10-21, and 24-31.

Embodiment 37

A radio access network (RAN) node for configuring user plane access stratum (AS) security in a wireless communication system that includes a RAN and a core network (CN), the RAN node comprising: an activation indication obtaining module for obtaining an activation indication that indicates a decision by the CN of whether or not the RAN node is to activate user plane AS security; and an overrule allowance indication obtaining module for obtaining an overrule allowance indication that indicates whether or not the RAN node is allowed to overrule the decision by the CN.

Embodiment 38

The RAN node of embodiment 37, comprising one or more modules for performing the method of any of embodiments 2-6, 10-21, and 24-31.

Embodiment 39

A core network (CN) node for configuring user plane access stratum (AS) security in a wireless communication system that includes a radio access network (RAN) and a core network (CN), the CN node configured to: signal an activation indication that indicates a decision by the CN of whether or not a RAN node in the RAN is to activate user plane AS security; and signal an overrule allowance indication that indicates whether or not the RAN node is allowed to overrule the decision by the CN.

Embodiment 40

The CN node of embodiment 39, configured to perform the method of any of embodiments 8-21 and 24-31.

Embodiment 41

A core network (CN) node for configuring user plane access stratum (AS) security in a wireless communication system that includes a radio access network (RAN) and a core network (CN), the CN node comprising: processing circuitry and a memory, the memory containing instructions executable by the processing circuitry wherein the CN node is configured to: signal an activation indication that indicates a decision by the CN of whether or not a RAN node in the RAN is to activate user plane AS security; and signal an overrule allowance indication that indicates whether or not the RAN node is allowed to overrule the decision by the CN.

Embodiment 42

The CN node of embodiment 41, the memory containing instructions executable by the processing circuitry wherein the CN node is configured to perform the method of any of embodiments 8-21 and 24-31.

Embodiment 43

A core network (CN) node for configuring user plane access stratum (AS) security in a wireless communication system that includes a radio access network (RAN) and a core network (CN), the CN node comprising: an activation indication signaling module for signaling an activation indication that indicates a decision by the CN of whether or not a RAN node in the RAN is to activate user plane AS security; and an overrule allowance indication signaling module for signaling an overrule allowance indication that indicates whether or not the RAN node is allowed to overrule the decision by the CN.

Embodiment 44

The CN node of embodiment 43, comprising one or more modules for performing the method of any of embodiments 8-21 and 24-31.

Embodiment 45

A wireless communication device configured for use in a wireless communication system that includes a radio access network (RAN) and a core network (CN), the wireless communication device configured to: responsive to a RAN node in the RAN not being able to activate user plane access stratum (AS) security according to a decision by the CN that the CN does not allow the RAN node to overrule, receive signaling steering the wireless communication device to establish a user plane session with a different RAN node.

Embodiment 46

The wireless communication device of embodiment 45, configured to perform the method of any of embodiments 23-31.

Embodiment 47

A wireless communication device configured for use in a wireless communication system that includes a radio access network (RAN) and a core network (CN), the wireless communication device comprising: processing circuitry and a memory, the memory containing instructions executable by the processing circuitry wherein the CN node is configured to, responsive to a RAN node in the RAN not being able to activate user plane access stratum (AS) security according to a decision by the CN that the CN does not allow the RAN node to overrule, receive signaling steering the wireless communication device to establish a user plane session with a different RAN node.

Embodiment 48

The wireless communication device of embodiment 47, the memory containing instructions executable by the processing circuitry wherein the CN node is configured to perform the method of any of embodiments 23-31.

Embodiment 49

A wireless communication device configured for use in a wireless communication system that includes a radio access network (RAN) and a core network (CN), the wireless communication device comprising: a receiving module for, responsive to a RAN node in the RAN not being able to activate user plane access stratum (AS) security according to a decision by the CN that the CN does not allow the RAN node to overrule, receiving signaling steering the wireless communication device to establish a user plane session with a different RAN node.

Embodiment 50

The wireless communication device of embodiment 49, comprising one or more modules for performing the method of any of embodiments 23-31.

Embodiment 51

A computer program comprising instructions which, when executed by at least one processor of equipment configured for use in a wireless communication system, causes the equipment to perform the method of any of embodiments 1-31.

Embodiment 52

A carrier containing the computer program of embodiment 51, wherein the carrier is one of an electronic signal, optical signal, radio signal, or computer readable storage medium.

The invention claimed is:

1. A method for configuring user plane access stratum, AS, security in a wireless communication system that includes a radio access network, RAN, and a core network, CN, the method performed by a RAN node in the RAN and comprising:
receiving, from the CN, signaling that indicates a decision by the CN of whether or not the RAN node is to activate user plane AS security and that indicates whether or not the RAN node is allowed to overrule the decision by the CN; and
activating or not activating user plane AS security, depending on the signaling.

2. The method of claim 1, comprising activating or not activating user plane AS security, further depending on information indicating an ability or desirability of the RAN node to activate user plane AS security.

3. The method of claim 1, further comprising determining whether or not activate user plane AS security, based on one or more of:
a loading level of the RAN node;
power efficiency or availability at the RAN node;
authorization of the CN to activate user plane AS security; and
a mode of the RAN node.

4. The method of claim 1, wherein the signaling applies specifically for a particular user plane session and is received during a procedure for establishing the user plane session for a particular wireless communication device.

5. The method of claim 1, further comprising performing one or more actions when the decision by the CN is that the RAN node is to activate user plane AS security, the RAN node is not allowed to overrule the decision by the CN, and the RAN node is not able, or the CN is not authorized, to activate user plane AS security, wherein the one or more actions include canceling, rejecting, or dropping a user plane session or user plane session establishment.

6. The method of claim 1, wherein the decision by the CN is a decision of whether or not the RAN node is to activate user plane AS security in the form of user plane integrity protection or is a decision of whether or not the RAN node is to activate user plane AS security in the form of user plane confidentiality protection.

7. The method of claim 1, wherein the decision is made by a CN node that performs user plane session management.

8. The method of claim 1, wherein the signaling indicates whether or not the RAN node is allowed to overrule the decision by the CN by indicating whether the decision by the CN is a command that the RAN node must comply with or a preference that the RAN node is permitted to overrule.

9. A method for configuring user plane access stratum, AS, security in a wireless communication system that includes a radio access network, RAN, and a core network, CN, the method performed by a CN node in the CN and comprising:
making a decision by the CN of whether or not a RAN node in the RAN is to activate user plane AS security; and
transmitting signaling that indicates the decision by the CN and that indicates whether or not the RAN node is allowed to overrule the decision by the CN.

10. The method of claim 9, further comprising determining whether or not the RAN node is allowed to overrule the decision, based on and/or specifically for one or more of:
a particular type of user plane AS security;
a particular type or priority of service for which user plane traffic is to be communicated over user plane AS;
a particular RAN node location or location type;
a particular RAN node loading level;
a particular type or priority of subscriber whose user plane traffic is to be communication over user plane AS; and
a particular time or event.

11. The method of claim 9, wherein the signaling applies specifically for a particular user plane session and is transmitted during a procedure for establishing the user plane session for a particular wireless communication device.

12. The method of claim 9, wherein the decision is:
a decision of whether or not the RAN node is to activate user plane AS security in the form of user plane integrity protection; or
a decision of whether or not the RAN node is to activate user plane AS security in the form of user plane confidentiality protection.

13. The method of claim 9, wherein the CN node is configured to perform user plane session management.

14. The method of claim 9, wherein the signaling indicates whether or not the RAN node is allowed to overrule the decision by the CN by indicating whether the decision by the CN is a command that the RAN node must comply with or a preference that the RAN node is permitted to overrule.

15. A radio access network, RAN, node for configuring user plane access stratum, AS, security in a wireless communication system that includes a RAN and a core network, CN, the RAN node comprising:
communication circuitry; and
processing circuitry configured to:
receive, from the CN, signaling that indicates a decision by the CN of whether or not the RAN node is to activate user plane AS security and that indicates whether or not the RAN node is allowed to overrule the decision by the CN; and
activate or not activate user plane AS security, depending on the signaling.

16. The RAN node of claim 15, wherein the processing circuitry is configured to activate or not activate user plane AS security, further depending on information indicating an ability or desirability of the RAN node to activate user plane AS security.

17. The RAN node of claim 15, wherein the processing circuitry is further configured to determine whether or not activate user plane AS security, based on one or more of:
- a loading level of the RAN node;
- power efficiency or availability at the RAN node;
- authorization of the CN to activate user plane AS security; and
- a mode of the RAN node.

18. The RAN node of claim 15, wherein the signaling applies specifically for a particular user plane session and is received during a procedure for establishing the user plane session for a particular wireless communication device.

19. The RAN node of claim 15, wherein the processing circuitry is further configured to perform one or more actions when the decision by the CN is that the RAN node is to activate user plane AS security, the RAN node is not allowed to overrule the decision by the CN, and the RAN node is not able, or the CN is not authorized, to activate user plane AS security, wherein the one or more actions include canceling, rejecting, or dropping a user plane session or user plane session establishment.

20. The RAN node of claim 15, wherein the decision by the CN is a decision of whether or not the RAN node is to activate user plane AS security in the form of user plane integrity protection or is a decision of whether or not the RAN node is to activate user plane AS security in the form of user plane confidentiality protection.

21. The RAN node of claim 15, wherein the decision is made by a CN node that performs user plane session management.

22. The RAN node of claim 15, wherein the signaling indicates whether or not the RAN node is allowed to overrule the decision by the CN by indicating whether the decision by the CN is a command that the RAN node must comply with or a preference that the RAN node is permitted to overrule.

23. A core network, CN, node for configuring user plane access stratum, AS, security in a wireless communication system that includes a radio access network, RAN, and a core network, CN, the CN node comprising:
- communication circuitry; and
- processing circuitry configured to:
  - make a decision whether or not a RAN node in the RAN is to activate user plane AS security; and
  - transmit signaling that indicates the decision and that indicates whether or not the RAN node is allowed to overrule the decision.

24. The CN node of claim 23, wherein processing circuitry is further configured to determine whether or not the RAN node is allowed to overrule the decision, based on and/or specifically for one or more of:
- a particular type of user plane AS security;
- a particular type or priority of service for which user plane traffic is to be communicated over user plane AS;
- a particular RAN node location or location type;
- a particular RAN node loading level;
- a particular type or priority of subscriber whose user plane traffic is to be communication over user plane AS; and
- a particular time or event.

25. The CN node of claim 23, wherein the signaling applies specifically for a particular user plane session and is transmitted during a procedure for establishing the user plane session for a particular wireless communication device.

26. The CN node of claim 23, wherein the decision is a decision of whether or not the RAN node is to activate user plane AS security in the form of user plane integrity protection or is a decision of whether or not the RAN node is to activate user plane AS security in the form of user plane confidentiality protection.

27. The CN node of claim 23, wherein the CN node is configured to perform user plane session management.

28. The CN node of claim 23, wherein the signaling indicates whether or not the RAN node is allowed to overrule the decision by indicating whether the decision is a command that the RAN node must comply with or a preference that the RAN node is permitted to overrule.

* * * * *

UNITED STATES PATENT AND TRADEMARK OFFICE
CERTIFICATE OF CORRECTION

PATENT NO. : 10,667,126 B2  
APPLICATION NO. : 16/338613  
DATED : May 26, 2020  
INVENTOR(S) : Wifvesson et al.

Page 1 of 2

It is certified that error appears in the above-identified patent and that said Letters Patent is hereby corrected as shown below:

On the Title Page

Item (74), under "Attorney, Agent, or Firm", in Column 2, Lines 1-2, delete "Murphy, Nilak & Homiller, PLLC" and insert -- Murphy, Bilak & Homiller, PLLC --, therefor.

In the Drawings

In Fig. 6A, Sheet 7 of 18, in Tag "600", Line 1, delete "NODE .G., BASE STATION)" and insert -- NODE (E.G., BASE STATION) --, therefor.

In the Specification

In Column 13, Line 56, delete "obtaining unit or module 1010" and insert -- obtaining unit or module 710 --, therefor.

In Column 17, Line 48, delete "AMF 46," and insert -- AMF 44, --, therefor.

In Column 17, Line 52, delete "AMF 46)" and insert -- AMF 44) --, therefor.

In Column 18, Line 3, delete "that protection" and insert -- the protection --, therefor.

In Column 20, Line 52, delete "11." and insert -- 11 --, therefor.

In Column 23, Line 51, delete "AMF 46)" and insert -- AMF 44) --, therefor.

In Column 25, Line 16, delete "AMF 46" and insert -- AMF 44 --, therefor.

In Column 25, Line 51, delete "obtained n" and insert -- obtained in --, therefor.

In Column 25, Line 63, delete "AMF 46" and insert -- AMF 44 --, therefor.

Signed and Sealed this  
First Day of September, 2020

Andrei Iancu  
*Director of the United States Patent and Trademark Office*

CERTIFICATE OF CORRECTION (continued)
U.S. Pat. No. 10,667,126 B2

In Column 27, Line 40, delete "(CPE). a" and insert -- (CPE), a --, therefor.

In Column 32, Line 16, delete "according one" and insert -- according to one --, therefor.

In Column 36, Lines 42-52, delete
"Embodiment 33
A radio access network (RAN) node for configuring user plane access stratum (AS) security in a wireless communication system that includes a RAN and a core network (CN), the RAN node configured to: obtain an activation indication that indicates a decision by the CN of whether or not the RAN node is to activate user plane AS security; and obtain an overrule allowance indication that indicates whether or not the RAN node is allowed to overrule the decision by the CN.".

In the Claims

In Column 40, Line 35, in Claim 10, delete "communication" and insert -- communicated --, therefor.

In Column 42, Line 21, in Claim 24, delete "communication" and insert -- communicated --, therefor.